United States Patent [19]

Fukuda

[11] Patent Number: 5,625,714
[45] Date of Patent: Apr. 29, 1997

[54] IMAGE SIGNAL DECODING DEVICE CAPABLE OF REMOVING BLOCK DISTORTION WITH SIMPLE STRUCTURE

[75] Inventor: Hiroyuki Fukuda, Tokyo, Japan

[73] Assignee: Olympus Optical Co., Ltd., Tokyo, Japan

[21] Appl. No.: 238,983

[22] Filed: May 6, 1994

Related U.S. Application Data

[63] Continuation of Ser. No. 813,798, Dec. 26, 1991, abandoned.

[30] Foreign Application Priority Data

| Jan. 10, 1991 | [JP] | Japan | 3-001497 |
| Jan. 10, 1991 | [JP] | Japan | 3-001499 |
| Mar. 19, 1991 | [JP] | Japan | 3-054935 |
| Jul. 15, 1991 | [JP] | Japan | 3-173726 |

[51] Int. Cl.⁶ .................................................. G06K 9/36
[52] U.S. Cl. ............................ 382/233; 382/239; 382/251
[58] Field of Search ......................... 382/56, 239, 232, 382/233, 251; 358/430, 433, 447, 463, 426; 348/404, 420, 437, 438

[56] References Cited

U.S. PATENT DOCUMENTS

| 4,754,492 | 6/1988 | Malvar | 348/403 |
| 4,941,043 | 7/1990 | Jass | 358/136 |
| 4,951,157 | 8/1990 | Koh et al. | 358/433 |
| 5,093,872 | 3/1992 | Tutt | 358/433 |
| 5,210,623 | 5/1993 | Weldy | 358/463 |
| 5,229,864 | 7/1993 | Moronaga et al. | 358/433 |
| 5,311,310 | 5/1994 | Jozawa et al. | 348/416 |
| 5,351,083 | 9/1994 | Tsukagoshi | 348/403 |
| 5,384,849 | 1/1995 | Jeong | 348/404 |

FOREIGN PATENT DOCUMENTS

| 198420A | 8/1988 | Japan | 358/433 |
| 246088A | 10/1988 | Japan | 358/433 |
| 1-311782 | 12/1989 | Japan | H04N 7/133 |

OTHER PUBLICATIONS

Malvar et al, "The LOT: Transform Coding Without Blocking Effects." IEEE Transactions on Acoustics, Speech, and Signal Processing, vol. 37, No. 4, Apr. 1989.

Primary Examiner—Jose L. Couso
Assistant Examiner—Matthew C. Bella
Attorney, Agent, or Firm—Frishauf, Holtz, Goodman, Langer & Chick, P.C.

[57] ABSTRACT

An image signal decoding device divides image data into blocks and performs orthogonal transform on image data of each of block to thereby decode coded image data. An inverse orthogonal transform circuit performs inverse orthogonal transform on the coded image data. A detecting circuit detects the band of each of the blocks of the coded image data. A distortion removing circuit changes the distortion removal characteristics according to the band detected by the detecting circuit to remove distortion of image data subjected to the inverse orthogonal transform by the inverse orthogonal transform circuit.

36 Claims, 19 Drawing Sheets

FIG. 2A
| 8310 | -216 | -760 | -19 | 4 | -2 | 8 | 0 |
|------|------|------|-----|---|----|----|----|
| -2086 | 519 | 700 | 90 | 9 | -1 | -4 | 0 |
| 586 | -529 | -38 | -20 | -4 | 5 | -1 | 0 |
| 163 | 302 | -26 | -70 | -6 | -3 | 0 | 0 |
| -9 | 8 | 6 | -7 | 3 | 1 | 0 | 0 |
| 8 | -3 | -5 | 8 | 9 | -2 | 3 | 0 |
| 0 | 4 | -1 | 7 | 5 | 0 | 0 | 0 |
| 1 | 2 | 1 | -2 | 7 | 8 | 0 | 0 |
FIG. 2B
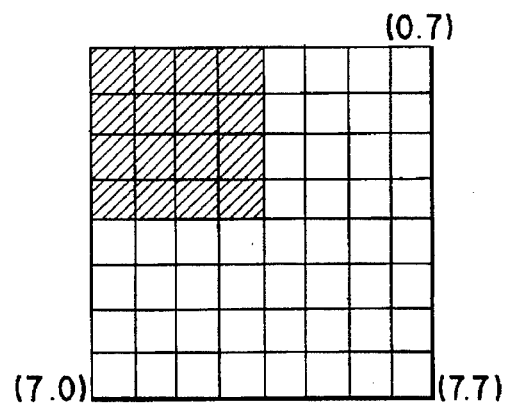
FIG. 2C
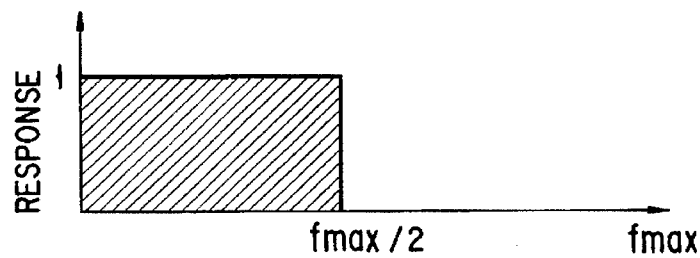

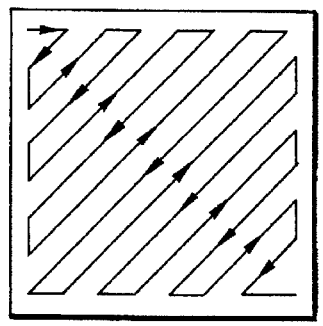
FIG. 4A
| 1 | 2 | 6 | 7 | 15 | 16 | 28 | 29 |
|---|---|---|---|---|---|---|---|
| 3 | 5 | 8 | 14 | 17 | 27 | 30 | 43 |
| 4 | 9 | 13 | 18 | 26 | 31 | 42 | 44 |
| 10 | 12 | 19 | 25 | 32 | 41 | 45 | 54 |
| 11 | 20 | 24 | 33 | 40 | 46 | 53 | 55 |
| 21 | 23 | 34 | 39 | 47 | 52 | 56 | 61 |
| 22 | 35 | 38 | 48 | 51 | 57 | 60 | 62 |
| 36 | 37 | 49 | 50 | 58 | 59 | 63 | 64 |
FIG. 4B
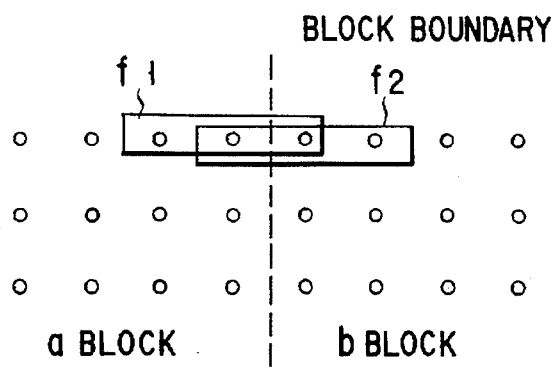
FIG. 4C
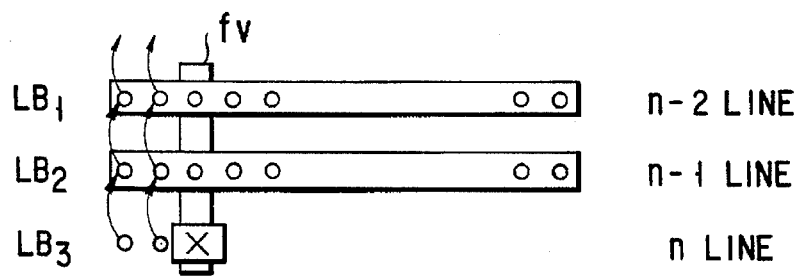
FIG. 4D

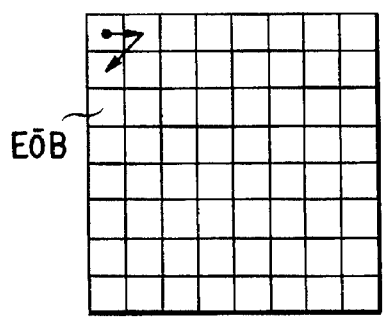 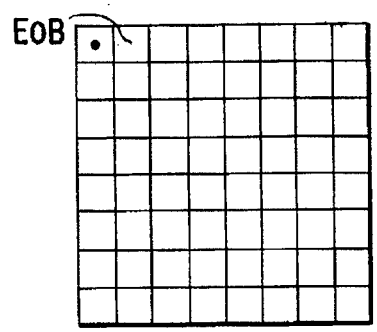
FIG. 6A　　　　　FIG. 6B
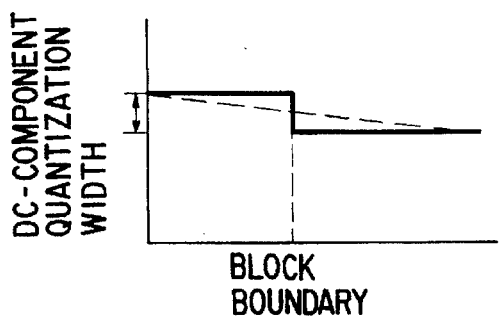 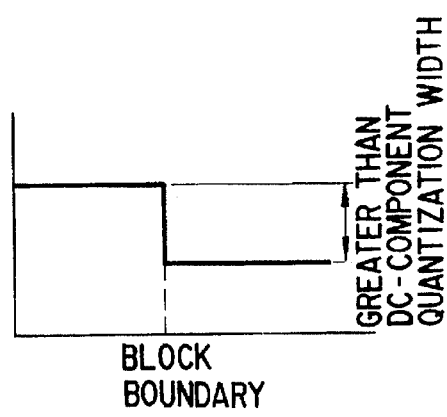
FIG. 7A　　　　　FIG. 7B
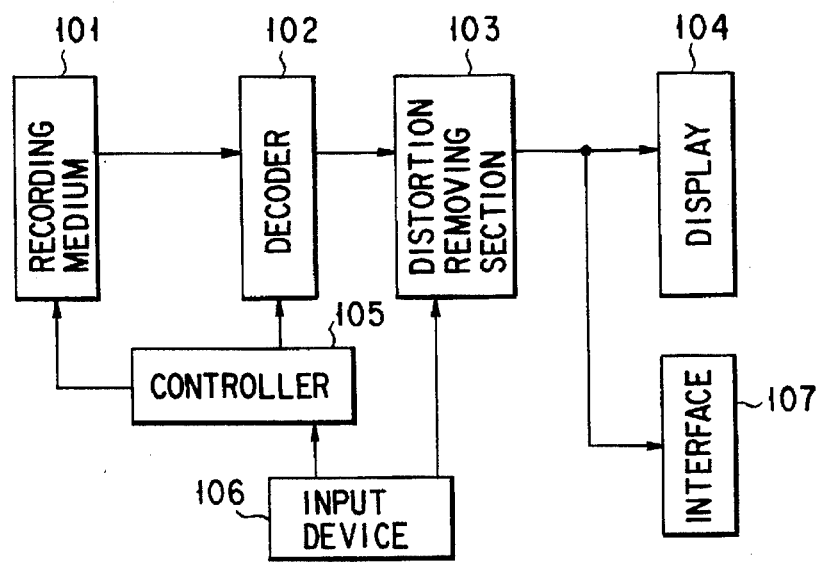
FIG. 8

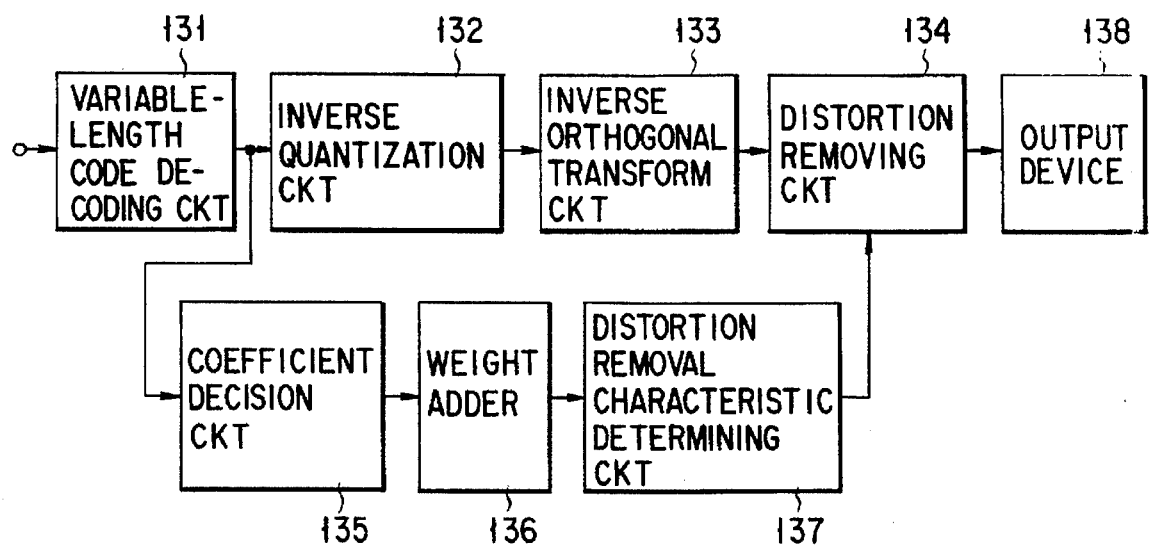
F I G. 11
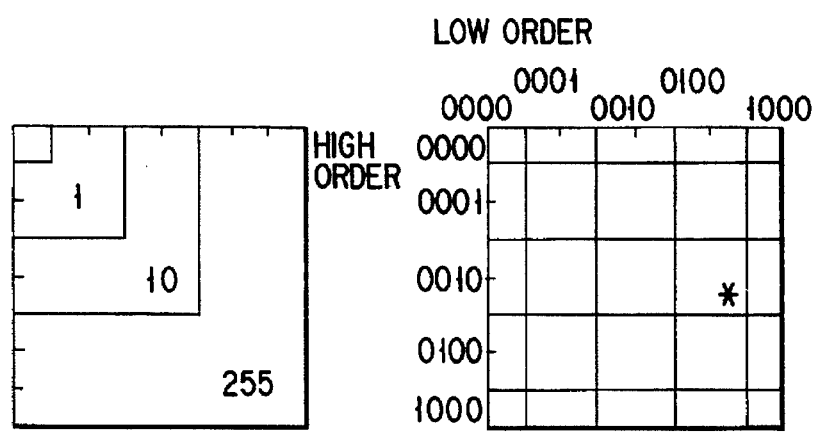
F I G. 12A     F I G. 12B

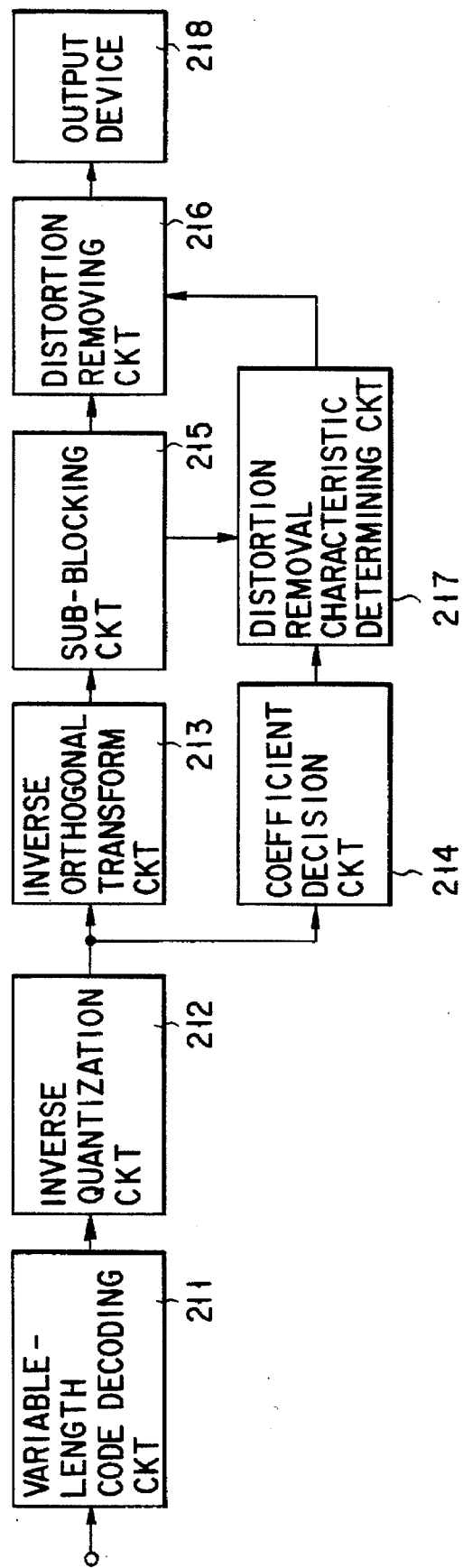
F I G. 13

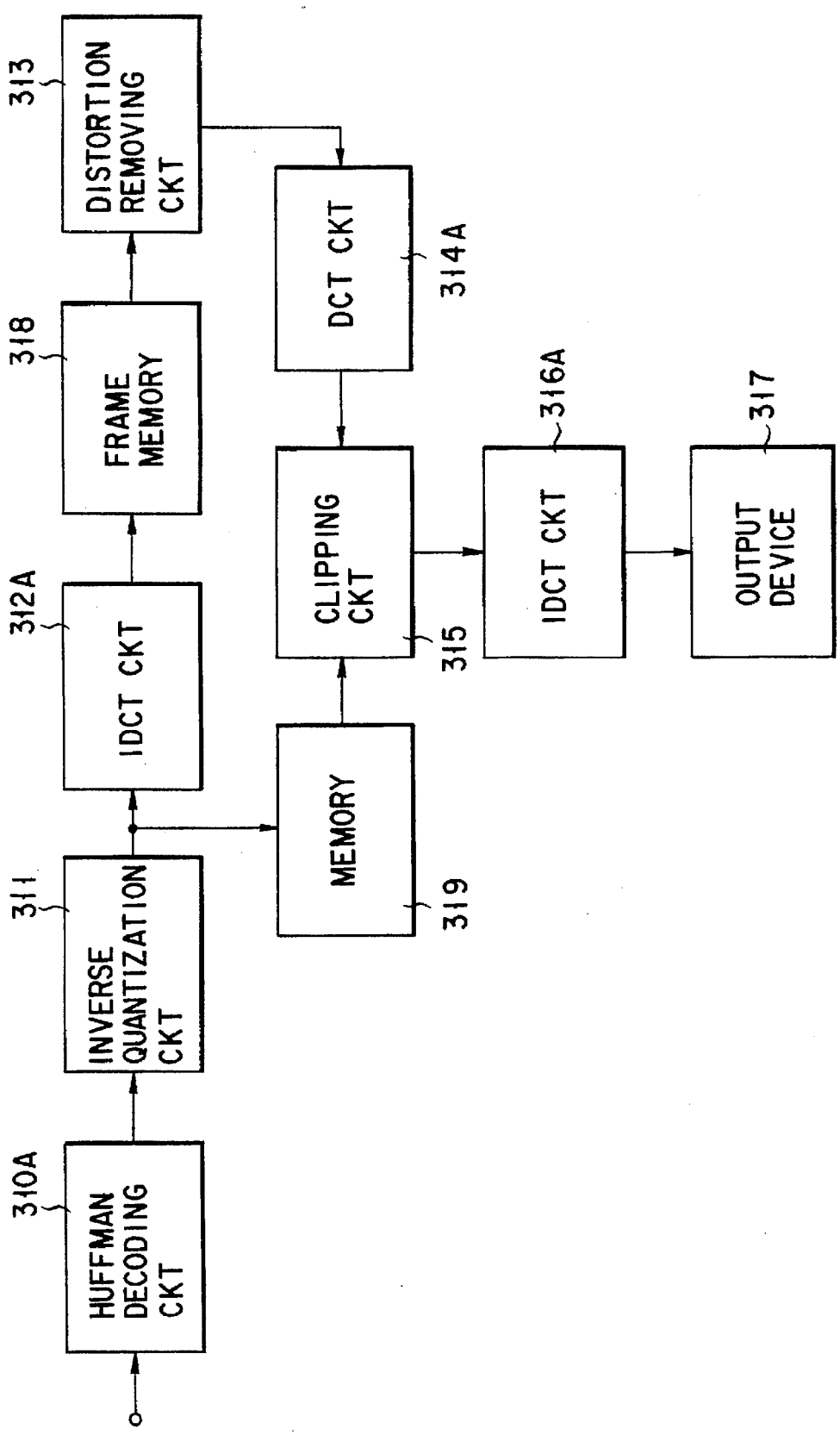
F I G. 20

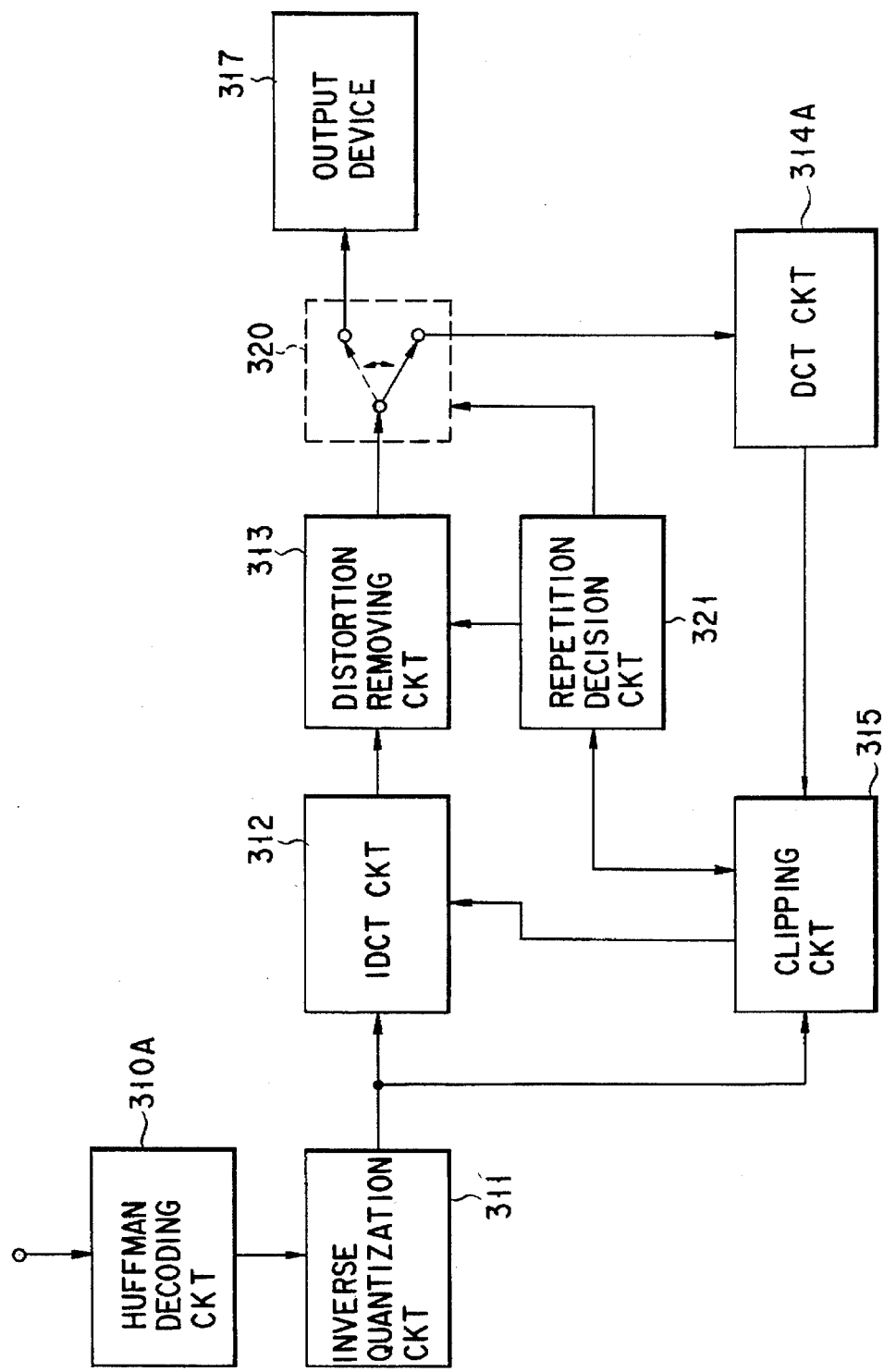
F I G. 21

IMAGE SIGNAL DECODING DEVICE CAPABLE OF REMOVING BLOCK DISTORTION WITH SIMPLE STRUCTURE

This application is a Continuation of application Ser. No. 07/813,798, filed Dec. 26, 1991, now abandoned.

BACKGROUND OF THE INVENTION

1. Field of the Invention

The present invention relates to an image signal decoding device for decoding image signals transmitted or recorded after compression and, more particularly, to speeding up of and improvements in the efficiency of a process of removing block distortion in such a device.

2. Description of the Related Art

In general, the quantity of data becomes very large when recording image signals produced by a solid-state image pickup device, such as a charge-coupled device, on a recording medium such as a memory card, a magnetic disk or magnetic tape as digital data. In order to record such data within a limited range of storage capacity, it is usually required to perform some high-efficiency compression on image signal data produced by the image pickup device.

As a high-efficiency method of compression of image data, an orthogonal transform coding method is well known. An example of such a method will be described with reference to FIG. 24.

First, image data f is input from a solid-state image pickup device (401) and then the image data is divided into blocks each of a predetermined size to obtain a value fb (402). The value fb is converted to a value F by performing two-dimensional discrete cosine transform (DCT) as orthogonal transform on each of the blocks (403). Next, linear quantization is performed on each of frequency components (404). As variable-length coding, huffman coding is performed on the quantized value Fq (405). The results of this coding are transmitted or recorded as compressed data C. The width of the linear quantization is determined by preparing a quantizing matrix representing relative quantizing characteristics taking visual characteristics for each frequency component into consideration and multiplying the matrix by a constant.

When recovering image data from the compressed data C, on the other hand, the quantized value Fq of the transform coefficient is obtained by decoding the variable-length code C (406). However, it is impossible to obtain the true value F prior to the quantization from Fq. The result F' obtained by inverse quantization will contain an error (407). Thus, inverse discrete cosine transform (IDCT) is performed on the value F' (408) and image data f' obtained by inverse-blocking the result fb' of the IDCT will also contain an error (409). The quality of the reproduced image f' output from the image reproducing apparatus will be deteriorated (410). That is to say, the error due to the inverse quantization, what is referred to as quantization error, results in the deterioration of the quality of the reproduced image f'.

The above operations will be described more specifically with reference to FIGS. 25A and 25B. First, as shown in FIG. 25A, a frame of image data is divided into blocks each of a predetermined size (blocks A, B, C, etc., each consisting of, for example, 8×8 pixels). As the orthogonal transform, two-dimensional DCT is performed on each of the divided blocks for sequential storage into an 8×8 matrix. From the viewpoint of a two-dimensional plane, image data has spatial frequencies which are frequency information based on the distribution of light and shade information. Therefore, image data is converted by the DCT to a direct current component DC and alternating current components AC as shown in FIG. 25B. In the 8×8 matrix, data indicating the value of the direct current component DC is stored in the position of the origin ((0, 0) position), data indicating the highest frequency of the alternating current components AC in the horizontal direction is stored in the (0, 7) position, data indicating the highest frequency of the alternating current components AC in the vertical direction is stored in the (7, 0) position, and data indicating the highest frequency of the alternating current components AC in the oblique direction is stored in the (7, 7) position. In intermediate positions frequency data in the directions related to their coordinate positions are stored such that frequency components appear sequentially in the order of frequency beginning with the lowest at the origin.

Next, data stored in each of the coordinate positions in the matrix is divided by a corresponding one of quantization widths for frequency components, thereby performing linear quantization on each of the frequency components. Huffman coding, which is a type of variable-length coding, is performed on each of the quantized values. At this point, for the direct current component DC, a difference between direct current components of blocks near to each other is huffman-coded.

For alternating current components AC, a scan, which is referred to as a zigzag scan, is made from low- to high-frequency components and two-dimensional huffman coding of the number of successive invalid (0 in value) components (the number of runs of zeros) and the values of following effective components is performed.

In this method, the rate of compression is generally controlled by varying the quantization width. The higher the rate of compression, the larger the quantization width becomes and thus the larger the quantization error becomes. The deterioration of the quality of reproduced images becomes noticeable accordingly.

The quantization error of the transform coefficient tends to appear in a reproduced image as block distortion in which discontinuity occurs at the boundary between blocks. The block distortion is visually noticeable and thus a subjective impression of the image will be unfavorable even if the signal-to-noise ratio is good.

To remove the distortion, a method has been devised which applies low-pass filtering to an image signal reproduced by a decoder. The post-filtering can remove the distortion relatively well. However, if edges are contained in an image, they will be blurred. Conversely, when the degree of the lowpass filtering is lessened so as to reduce the blurring of the edges, the block distortion cannot be removed completely.

To solve such a problem, a method has been devised which detects the presence or absence of edges in an image and block distortion and applies lowpass filtering only to portions where there is distortion.

With the distortion removing method which applies filtering only to distorted portions, however, blurring still occurs in an image and the amount of block distortion must be calculated. This requires a long processing time, a circuit on a certain scale and power dissipation. For this reason, it is difficult to apply the distortion removal method to devices in which down-sizing and high-speed performance are taken seriously.

SUMMARY OF THE INVENTION

It is accordingly an object of the present invention to provide an image signal decoding device which permits block distortion to be removed at high speed without producing blurring in an image by the use of circuitry simple in construction.

According to the present invention, an image signal decoding device for decoding coded image data by dividing the image data into blocks and performing orthogonal transform on the image data of each of the blocks, comprises:

inverse orthogonal transforming means for inverse orthogonal transforming the coded image data;

band detecting means for detecting the band of each of the blocks of the coded image data; and distortion removing means for removing distortion of image data subjected to the inverse orthogonal transform by said inverse orthogonal transforming means while varying distortion removal characteristics according to the band detected by said band detecting means.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 2A illustrates orthogonal transform coefficients of a block of interest;

FIG. 2B illustrates significant coefficients;

FIG. 2C illustrates a passband for band suppression;

FIGS. 4A and 4B illustrate the sequence of a zigzag scan;

FIG. 4C is a diagram for use in explanation of a filter whose kernel size is three pixels;

FIG. 4D illustrates the procedure of storage of data into a buffer memory;

FIGS. 6A and 6B are diagrams for use in explanation of another modification for detecting EOB;

FIGS. 7A and 7B are diagrams for use in explanation of a process in a case of a series of blocks whose DCT coefficients are only DC components;

FIG. 8 is a block diagram of a configuration for realizing another distortion removal method;

FIG. 11 is a block diagram of a modification of the second embodiment;

FIGS. 12A and 12B are diagrams for use in explanation of a weight for each of coefficients;

FIG. 13 is a block diagram of an image signal decoding device according to a third embodiment of the present invention;

FIG. 20 is a block diagram of the fourth embodiment of the present invention;

FIG. 21 is a block diagram of a modification of the fourth embodiment;

DETAILED DESCRIPTION OF THE PREFERRED EMBODIMENTS

Hereinafter, the preferred embodiments of the present invention will be described with reference to the drawings.

Figure 1:
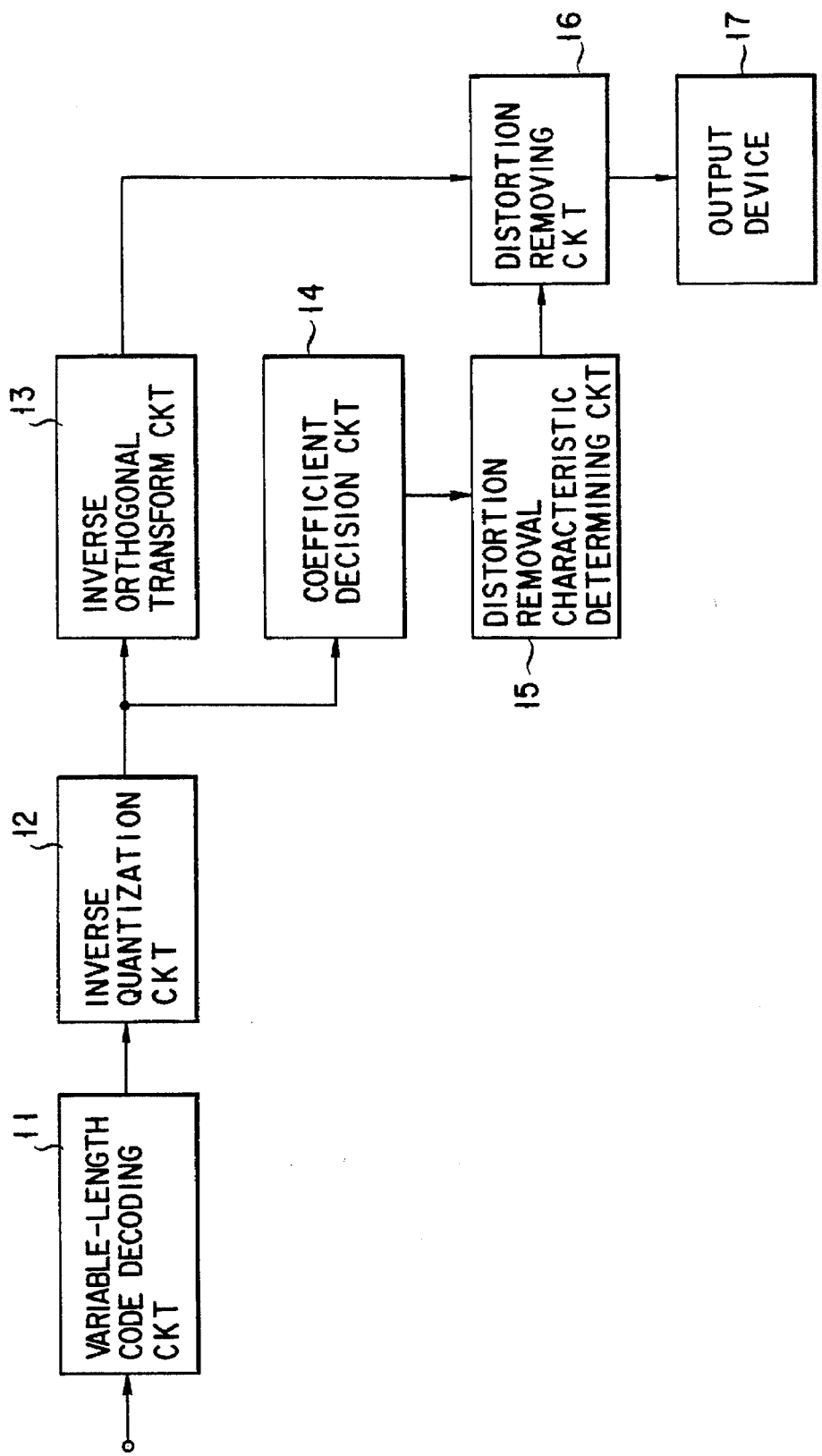
FIG. 1 is a block diagram of an image signal decoding device according to a first embodiment of the present invention.

FIG. 1 is a block diagram of an image signal decoding device according to a first embodiment of the present invention. In the image signal decoding device, a variable-length code decoding circuit 11 receives compressed image data transmitted or recorded and decodes variable-length codes of the compressed image data. The decoded output is subjected to inverse quantization by an inverse quantization circuit 12. The results of the inverse quantization are transformation coefficients for each of the blocks and thus correspond to spatial frequencies in blocks.

The data is applied to an inverse orthogonal transform circuit 13 and a coefficient decision circuit 14. The inverse orthogonal transform circuit 13 performs inverse orthogonal transform on the received data to obtain an image signal in real-space.

The data applied to the coefficient decision circuit 14 is used to determine distortion removal characteristics for the real-space image signal. The determination of the characteristics is made as follows. That is, in the coefficient decision circuit 14, a comparison is made between absolute values of spatial frequency components and a threshold value for each of the blocks and coefficients larger than the threshold value are made to be significant coefficients. Next, in a distortion removal characteristic decision circuit 15, lowpass characteristics are determined such that the band of these significant coefficients is preserved. A distortion removal circuit 16 performs a distortion removing process of the determined lowpass characteristics on the image signal from the inverse orthogonal transform circuit 13.

The image signal subjected to the distortion removing process are output to an output device 17 such as an image display.

By performing distortion removal in this way, information recorded for each of the blocks can be filtered without losing most of its band. That is to say, strong lowpass filtering which permits averaging over a wide range is performed on blocks each having only low spatial frequency components and, on the other hand, weak lowpass filtering which causes little blurring of image is performed on blocks containing relatively high-frequency components, thereby realizing lowpass filtering to an extent that the structures within blocks do not blur.

Next, the method of determining the distortion removal characteristics will be described.

Suppose now that orthogonal transform coefficients of a block of interest, which are applied to the coefficient decision circuit 14, are such DCT (discrete cosine transform) coefficients of 8×8 pixels as shown in FIG. 2A. A comparison between the absolute value of each coefficient and a threshold value th (=10) decides that the coefficients indicated by oblique hatching in FIG. 2B are significant coefficients not less than the threshold value 10. In this case, it is seen that the block contains a structure which can be represented by information of up to a frequency half the highest frequency (half of the sampling frequency) in the horizontal and vertical directions. Thus, the filtering characteristics for the block have only to be set so as to cut frequencies higher than half the highest frequency in both of the horizontal and vertical directions. For simplicity, consider this state in terms of one dimension of only the horizontal direction in the above example.

As described above, when it is seen from the significant coefficient corresponding to the highest frequency component that the block of interest is composed of frequency components lower than or equal to half the highest frequency (fmax), the block is found to have a bandwidth of fmax/2. Thus, it is only required to reject frequency components higher than fmax/2. That is, the filtering characteristics have only to be set such that a portion indicated by oblique hatching in FIG. 2C becomes the passband.

This is expressed by $$H = F \times G \quad (1)$$

Equation (1) represents filtering in the frequency region and F, G, and H indicate coefficients on the Fourier plane of data, filter and results of processing, respectively.

However, when filtering is performed on a spatial frequency plane, it is impossible to perform processing while varying the filtering characteristics. Thus, it is required to perform filtering in the spatial frequency plane after blocking of the image and compose an image after inverse transform. At this time, a problem arises in that the influence of blocking must be taken into consideration. For this reason, the filtering is realized by means of convolution in real space and coefficients to be convoluted are changed.

$$h = f * g \quad (2)$$

In equation (2), f, g and h represent results of inverse Fourier transform of F, G and H. The equation represents the case where filtering of equation (1) is processed in real space. As can be seen from equation (2), the filtering is performed by convolution of data f and g. The kernel size of g is finite and thus it is difficult to obtain such a sharp cutoff characteristic as shown in FIG. 2C. However, there is no problem in practical application and the way of determining filter coefficients and kernel size may be arbitrary. They are determined taking a calculating time and cutoff characteristics into consideration.

According to the present invention, therefore, by adaptively applying convolution lowpass filtering, which preserves a band possessed by significant data of transform coefficients obtained by decoding compressed data, to each of blocks, distortion can be removed without blurring the structure of each block. Since the filtering characteristics are determined using transform coefficients which are intermediate results of the decoding process, there is no need of detecting the presence or absence of edges in an image and block distortion. Thus, the decoding device can be realized with a very simple circuit configuration and the processing time can be made short because the processing involves only comparison with a threshold value.

Figure 3:
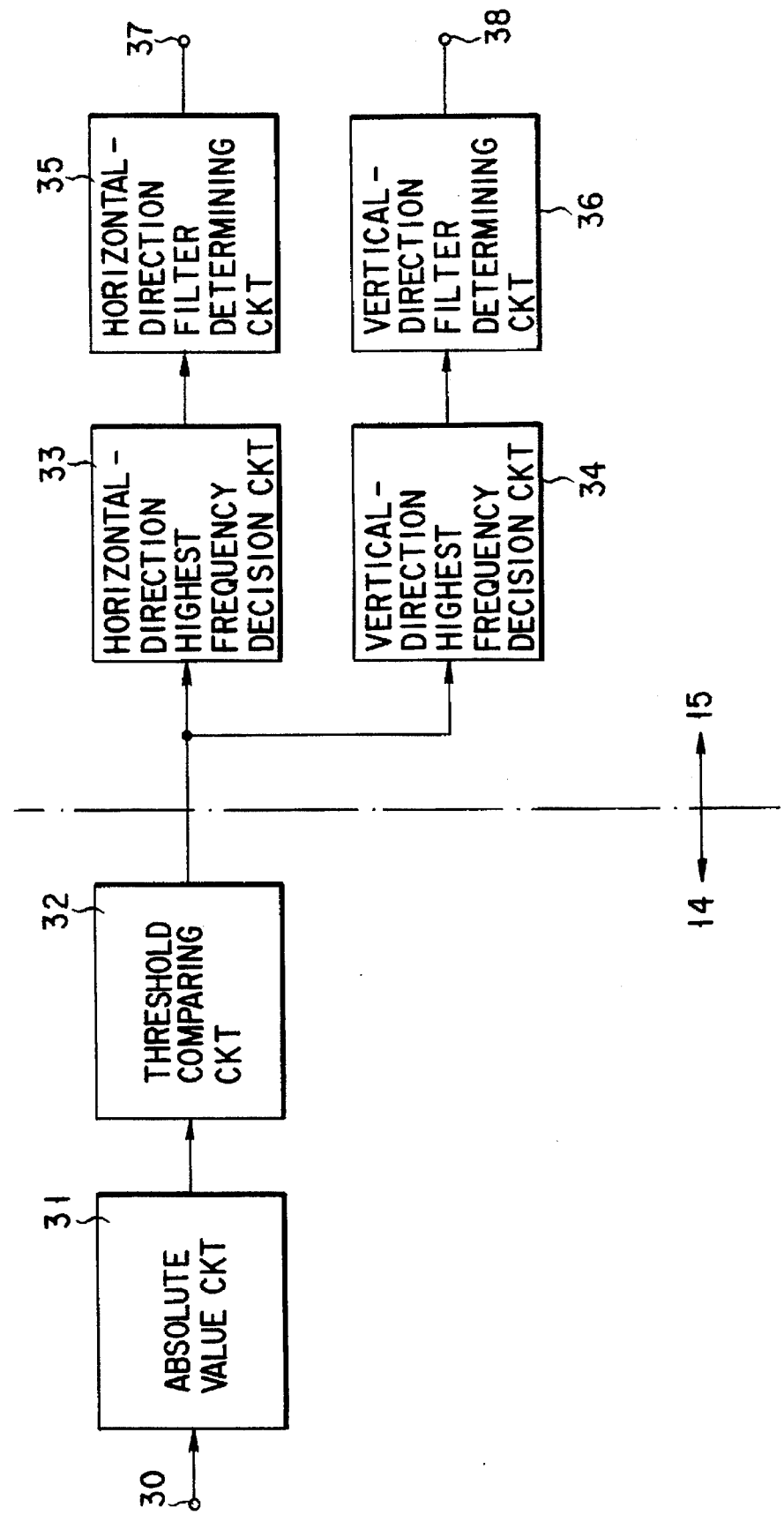
FIG. 3 is a block diagram of a coefficient decision circuit and a distortion removing characteristic determining circuit.

The coefficient decision circuit 14 and the distortion removal characteristic determining circuit 15 are constructed actually as shown in FIG. 3.

The output of the inverse quantization circuit 12 is input to an absolute value circuit 31 via an input terminal 30, so that absolute values are calculated. The absolute values are compared with a predetermined threshold value by a threshold comparison circuit 32, so that they are divided into significant coefficients and non-significant coefficients. The output of the threshold comparison circuit is applied to a horizontal-direction highest frequency decision circuit 33 and a vertical-direction highest frequency decision circuit 34 to obtain the highest frequencies in the horizontal and vertical directions. The highest frequencies in the horizontal and vertical directions are applied to a horizontal direction filter determining circuit 35 and a vertical-direction filter determining circuit 36, so that kernel sizes and coefficients of filters in the horizontal and vertical directions are determined. They are output from output terminals 37 and 38.

Hereinafter, the highest-frequency decision and the filter determination will be described with the case of the horizontal direction taken as an example.

Data of a block are given by the threshold comparison circuit 32 in the order in which they are zigzag scanned as shown in FIG. 4A. Thus, the horizontal-direction highest frequency decision circuit 33 examines the column number to which an incoming significant coefficient belongs depending on how many coefficients there were before the significant coefficient and obtains the highest frequency in the horizontal direction in accordance with the maximum column number of all the significant coefficients.

For example, when the first coefficient is significant, "1" is stored in a temporary memory not shown. Next, when the fourteenth coefficient is significant, it is seen from FIG. 4B that the coefficient is in the second row, the fourth column. A comparison is made between the value "1" stored in the temporary memory and the column number "4" and a larger one is stored in the memory. Upon termination of the decision of all of significant coefficients in a block, the value stored in the temporary memory is output. Thus, even if the twentieth coefficient is significant after the fourteenth coefficient, since it is in the second column, the output of the horizontal-direction highest-frequency decision circuit 33 remains unchanged.

The output of the decision circuit 33 can assume a value of 0 to 8 and thus the horizontal-direction filter decision circuit 35 has only to be provided with at most nine filters. Usually, as many as four or five filters are enough.

In the vertical direction as well, filters are determined in the same way.

It is required to previously store a correspondence between the order of the coefficients and the row and column numbers and filter characteristics in the form of a table.

Next, a method of actually performing the filtering will be described.

Image data obtained by the inverse orthogonal transform circuit 13 is recorded into a buffer memory not shown while being subjected to horizontal-direction filtering by the distortion removal circuit 16 on a line-by-line basis. At this time, as shown in FIG. 4C, filters whose kernel size is three pixels are used. When a pixel of interest positioned at the center is contained in the a block, a filter f1 is used which is determined on the basis of transform coefficients of the a block, while, when a pixel of interest is contained in the b block, a filter f2 determined on the basis of transform coefficients of the b block is used.

The buffer memory has a capacity of two lines and one pixel. Supposing that the result of horizontal-direction filtering for the nth line is output to the pixel X in the line buffer LB3 of FIG. 4D as described above, the pixel of interest of the third row for vertical-direction filtering fv is the pixel on the (n−1)st line and a pixel on a line next to a line which is being subjected to vertical-direction filtering is read into the line buffer LB3. Subsequently, vertical-direction filtering fv is performed on the third row with the pixel of the line buffer LB2 as a pixel of interest and the result of the filtering is output to the third row of the (n−1)st line of the frame memory. Subsequently, data of the same row in the line buffer LB1 is discarded and data of the same row in the line buffer LB2 is transferred to the same row in the line buffer LB1. Further, data of the same row in the line buffer LB3 is transferred to the same row of the line buffer LB2. That is, the line buffers LB1 and LB2 are each a one-line memory and store data on the (n−1)st line and the nth line, respectively, before the row where there is a pixel of interest. After the row where there is a pixel of interest the line buffers LB2 and LB1 store data on the (n−1)th line and the (n−2)nd line, respectively.

Such processing is performed on all the lines. However, for edges of an image, such as a leading line and the last pixel, pixels are virtually extrapolated to the outside of the image region.

In the first embodiment, the kernel size of the filters is three. The present invention is not limited to this. Increasing of the number of the buffer memories will accommodate filters of greater size. Prior to filtering data for determining filter characteristics and reproduced data of all the blocks may be stored in a memory for subsequent filtering.

Next, a modification of the first embodiment will be described.

Figure 5A:
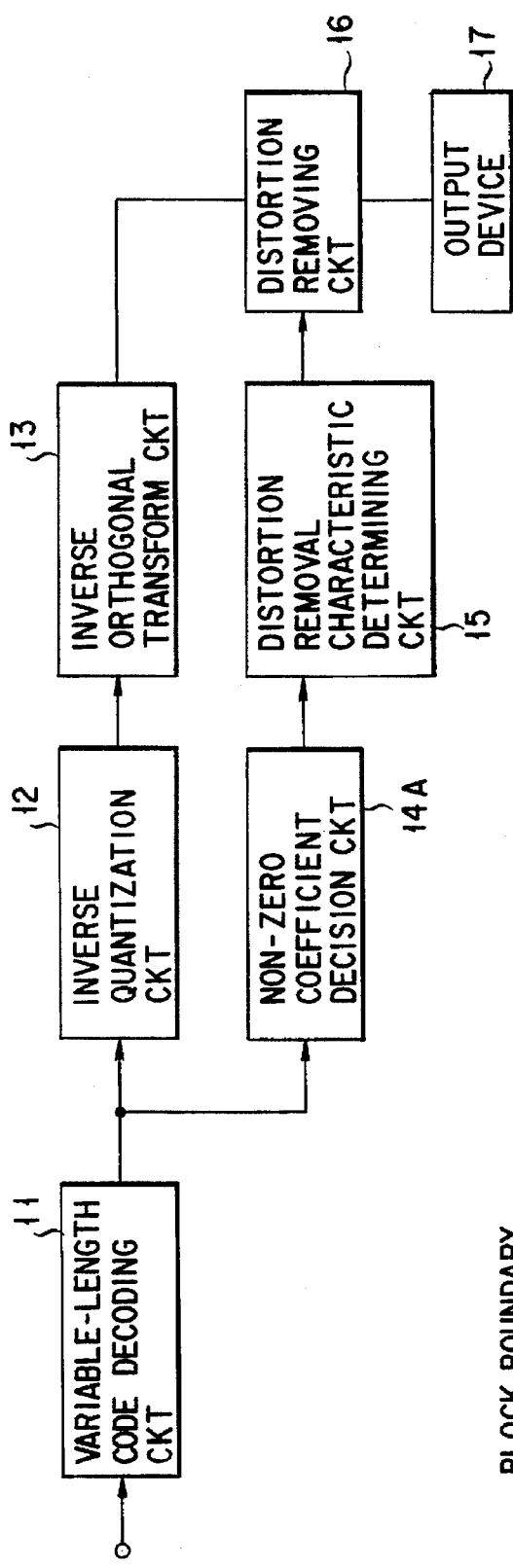
FIG. 5A is a block diagram of a modification of the image signal decoding device of the present invention.

In the coding to which the present invention is applied, the quantization width becomes great as compression rate is increased and there is high probability that coefficients will be quantized to 0s. In particular, most of high-frequency components, which are generally small in power, tend to be quantized to 0s. For this reason, the decision of whether or not the transform coefficients are significant coefficients may be made depending on whether or not the value of each coefficient is zero instead of comparison of the absolute value of each coefficient with a threshold value as in the first embodiment. By doing so, non-zero coefficients are decided to be significant coefficients prior to the inverse quantization of transform coefficients of each block, and thus the coefficient decision circuit 14 of FIG. 1 composed of the absolute value circuit 31 and the threshold comparison circuit 32 can be replaced with a non-zero coefficient decision circuit 14A as shown in FIG. 5A.

In another modification, where blocks in which significant coefficients are only low-frequency components or there are no significant coefficients come one after another, these blocks may be taken as a macro block. The macro block is subjected to strong lowpass filtering over a wide range.

Figure 5B:
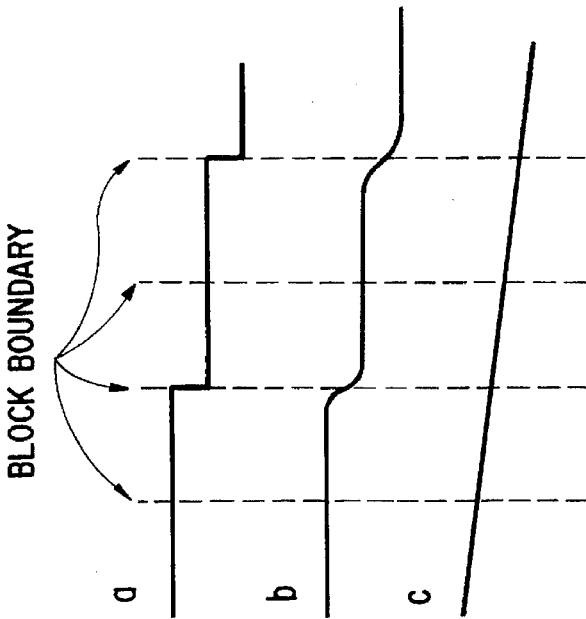
FIG. 5B is a diagram for use in explanation of the operation of another modification of the image signal decoding device of the present invention.

For example, when an image portion in which gradations vary very slowly like sky or a white wall is stepped as shown by a waveform a in FIG. 5B because of loss of alternating current components due to a high degree of compression, the block-by-block filtering as in the first embodiment will produce such gradations as shown by a waveform b in FIG. 5B. When observing the gradations as an image, they look as if edges are still present because of human visual characteristics. In this modification, therefore, several blocks or tens of blocks in which most of alternating current components are lost are taken as a macro block and smoothing is performed over a wide range within the macro block. Thereby, such gradations as shown by a waveform c in FIG. 5B are obtained.

Hereinafter, as still another modification, a method of obtaining significant coefficients within a block will be described.

In a system for recording data after zigzag scan of DCT coefficients using two-dimensional huffman codes of the number of zero runs and values of the succeeding effective components, there is a method of entering an EOB (end of block) signal after the last effective coefficient of a block. That is, when the decoder detects the EOB, it is decided that coefficients following the EOB are all zeros.

In this case, it is possible to obtain a range in which significant coefficient of the block are present in accordance with the position in which the EOB occurs.

For example, supposing that, as shown in FIG. 6A, an EOB indicating that the coefficient of "4" is followed by 0s is detected, it is seen that the band of the block has non-zero coefficients only within a range of two rows and two columns. In the case of FIG. 6B, it is seen that the block has no AC component but a DC value.

As described above, by causing the non-zero coefficient decision circuit 14A of FIG. 5 to detect the EOB, it becomes easy to obtain the band of a block.

The present invention adaptively changes a distortion removing process on the basis of a frequency band of significant transform coefficients. Adaptation using other decision information in addition to the frequency band information will be described below.

Consider now that, as shown in FIG. 5B, the waveform of a portion in which gradations vary slowly becomes stepped because of loss of alternating current components due to compression.

At this time, there should be a difference of a DC-component quantization step size between adjoining blocks. When an edge is superposed just on the block boundary, a difference in DC component between the adjoining blocks is generally larger than the quantization step size.

That is, when distortion removal is performed using only the band of the block, actual edge information will be lost in the latter case.

For this reason, when blocks each having only DC components as their DCT coefficients come one after another, an addition is made of such a judgment as to carry out the block-boundary distortion removing process only when a difference in DC component between adjoining blocks is equal to or less than the quantization step size.

This state will be described with reference to FIGS. 7A and 7B. FIG. 7A illustrates a case of the occurrence of distortion due to compression in a portion in which an edge does not exist in reality and the gradations vary slowly. As indicated by a solid line, adjoining blocks contain only DC components and their difference corresponds to the DC-component quantization width.

The distortion removal characteristic determining circuit 15 decides that a difference in level at the block boundary is distortion and then the distortion removal circuit 16 performs a distortion removing process to obtain such values as indicated by a broken line.

Where, as shown in FIG. 7B, the adjoining blocks contain only DC components, but their difference is greater than the DC-component quantization width, it is judged that there is an edge at the boundary in reality with the result that no distortion removing process is performed.

By doing so, the occurrence of a problem of the loss of inherent edge information can be avoided.

In a system using the present invention, it is desirable that a lowpass filter be used for distortion removing process as in the embodiment described previously. Preparation should be made of a filter having such characteristics as to permit a distortion removing effect to be obtained taking the filter's kernel size into consideration. However, depending on images, the filter may not be suitable. In this case, it is desired that switching be made between filters which have different coefficients and kernel sizes.

Specifically, as shown in FIG. 8, after observing on a display 104 an image which has been subjected to a distortion removing process once, the observer enters from an input device 106 a command for changing distortion removal characteristics if he or she does not like the image. In this case, a controller 105 reads data from a recording medium 101 again and a distortion removal processor 103 performs a new, different distortion removing process on a signal decoded by a decoder 102, thereby displaying a new image. That is, the observer can change the distortion removal characteristics to fit his or her liking.

Further, it will be more desirable to output an image that the observer likes to an interface 107 so that it is recorded on another recording medium, it is output to a printer or it is output compressed in a different compression rate.

According to the system, not only images recorded compressed can be displayed but also they can be output to fit other media. That is, problems in transmission of different transfer rates that, when the compression rate is changed with distortion, the distortion is emphasized and data contains distortion due to the previous compression in spite of high transfer rate can be solved. Images, for example, medical images, which are desired to be recorded without being subjected to a distortion removing process can also be recorded on another medium as they are.

Further, as a distortion removing process, the present invention can perform a median-filter nonlinear process or conversely apply edge emphasis to fine detail portions in addition to the lowpass filtering process. Hereinafter, a second embodiment of the present invention will be described. First, its basic concept will be explained.

In general, the noticeability of block distortion depends on spatial frequencies possessed by neighboring image portions. That is, where block distortion occurs in a portion which has a fine structure and contains components up to a high spatial frequency, it is not so noticeable. Conversely, where block distortion occurs in a portion which changes relatively slowly and contains only low spatial frequency components, it is noticeable.

On the other hand, block distortion is due to discontinuity at block boundaries and has components up to a very high spatial frequency. Thus, the block distortion can be made unnoticeable by removing spatial frequency components higher than frequencies possessed by an image portion near the distortion. By obtaining to what extent each block contains frequency components and adaptively changing the distortion removal characteristics on the basis of the value, the block distortion can be removed without blurring of an image.

In the coding to which the present embodiment is applied, the quantization width becomes large and the probability that coefficients are quantized to 0s becomes high as the compression rate is increased. In particular, most of high frequency components, which are small in power, are quantized to 0s and few of them remain as significant coefficients. Thus, when two-dimensional huffman coding of the number of zero runs and the values of succeeding significant coefficients is used, blocks having few high-frequency components tend to decrease in amount of coding occurring therein, while blocks containing significant coefficients of up to a high frequency component tend to increase in amount of coding occurring therein. That is, when there is a large amount of coding in a block, it is seen that even high-frequency coefficients have values. In the present embodiment, therefore, to obtain to what extent each block contains frequency components, the amount of coding in each block and the number of non-zero transform coefficients are used to adaptively change the distortion removal characteristics.

The distortion removal characteristic determining method is the same as that in the first embodiment and thus its explanation is omitted.

Figure 9:
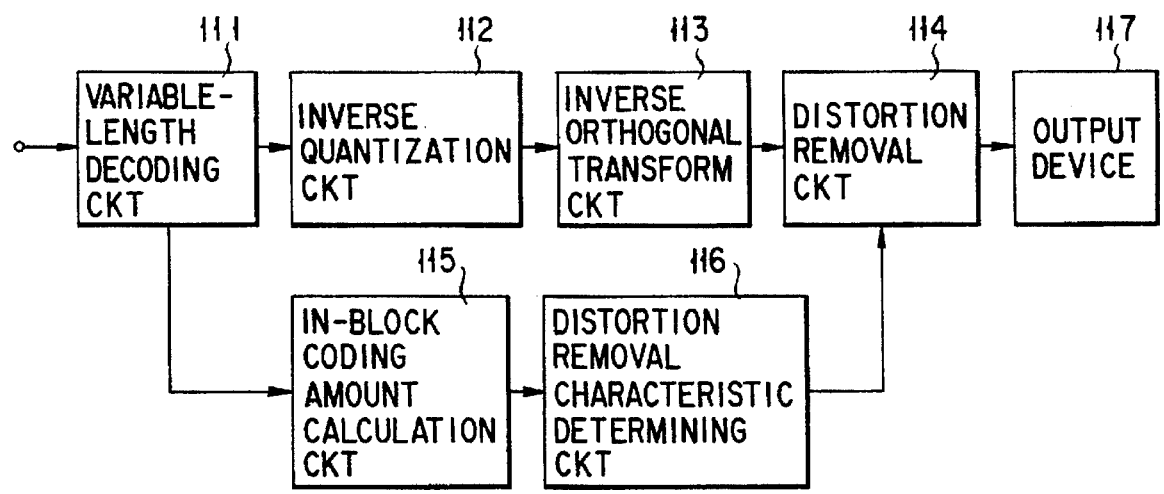
FIG. 9 is a block diagram of a second embodiment of the present invention.

FIG. 9 is a block diagram of the second embodiment of the present invention.

In the image signal decoding device of the present embodiment, a variable-length code decoding circuit 111 receives compressed image data which has been transmitted or recorded and decodes variable-length codes of the compressed image data. The decoded output is subjected to inverse quantization in an inverse quantization circuit 112. The results of the inverse quantization are applied to an inverse orthogonal transform circuit 113 to obtain an image signal in real space. A distortion removing circuit 114 performs a distortion removing process on the resulting image signal. The distortion removal characteristics for the image signal in real space is determined by a distortion removal characteristic determining circuit 116 on the basis of the amount of coding in each block input to the variable-length code decoding circuit 111 which is monitored by an in-block coding amount calculation circuit 115. The distortion removal characteristic determining circuit 116 determines such lowpass filter characteristics as permits a narrow frequency band to be preserved for blocks which are small in amount of coding.

Figure 10A:
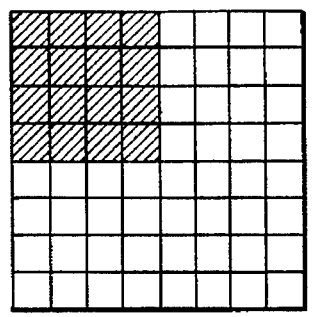
FIGS. 10A and 10B are diagrams illustrating a region of a block in which significant coefficients are present.
Figure 10B:
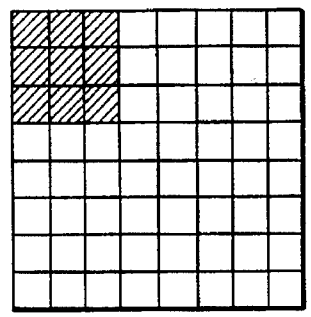

Suppose now that orthogonal transform coefficients of a block of interest applied to the inverse orthogonal transform circuit 113 are DCT coefficients of 8 pixels×8 pixels as shown in FIG. 10A and coefficients of 4 pixels×4 pixels indicated by oblique hatching are non-zero coefficients, or significant coefficients. Further, suppose that the DCT coefficients in a 3×3 portion of the next block are non-zero coefficients as shown in FIG. 10B. Then, the amount of coding obtained by the in-block coding amount calculation circuit 115 is larger in the block of interest than in the next block. It is also seen that the block of interest is wider than the next block in frequency band. Thus, the filter characteristics for the block of interest which is larger in the amount of coding is required to be set such that only high frequencies are cut in each of the horizontal and vertical directions.

Conversely, the characteristics for the next block may be set such that frequency components which are slightly lower than the cut-off frequency for the block of interest are cut.

In this case, the in-block coding amount calculation circuit 115 detects block boundaries in compressed code data and calculates the amount of coding contained between blocks. Thus, the processing is very easy and the circuit scale may also be small.

By performing distortion removal in that way, information recorded on a block-by-block basis can be filtered without losing most of its band. That is to say, strong lowpass filtering which permits averaging over a wide range is performed on blocks each of which is small in the amount of coding and thus has only low spatial frequency components and, on the other hand, weak lowpass filtering which causes little blurring of image is performed on blocks each of which is large in amount of coding and thus contains up to a relatively high-frequency component, thereby realizing lowpass filtering to an extent that the structures within blocks do not blur.

Hereinafter, a modification of the second embodiment will be described. According to this modification, the block frequency band is obtained on the basis of the number of significant coefficients. That is, this method makes a decision of whether or not coefficients decoded by a variable-length code decoding circuit 111 are significant coefficients and counts the number of significant coefficients in each block. Although the processing is complicated as compared with the method described above, the method, which utilizes transform coefficient information directly, permits more desirable distortion removal characteristics to be selected for each block. Here, the significant coefficients may be non-zero coefficients after quantization or coefficients which have been decided to be significant as a result of the comparison of absolute values of transform coefficients with a threshold value.

Hereinafter, another modification of the second embodiment will be described. According to this modification, distortion removal characteristics are determined on the basis of the sum of weights which are determined beforehand according to the sequence of significant coefficients. This method is described with reference to FIG. 11. The method makes a decision as to whether or not coefficients decoded by a variable-length code data circuit 131 are zeros, adds frequency-dependent weights of coefficients which are not zeros in a weight adder circuit 136 and determines distortion removal characteristics according to the sum of weights. Suppose that such weights as shown in FIG. 12A are used. According to this method, the weight adder circuit 136 is configured such that it has an 8-bit register and addition is stopped when an overflow occurs. The sum of weights is classified into four classifications according to whether the register value is 0, 9 or below, 169 or below or greater than 169. The four classifications correspond to the frequency bands of blocks. The distortion removal characteristics of each block can be determined on the basis of the register value and the frequency band of each block can be obtained more accurately than in the previous embodiment.

It is also possible to use the logical sum of the weights in place of the arithmetic sum thereof. The sequence of transform coefficients is divided into 25 regions as shown in FIG. 12B and the weight of each region is represented by high-order four bits corresponding to vertical-direction frequencies and low-order four bits corresponding to horizontal-direction frequencies. Supposing that a significant coefficient exists in a position indicated by * in FIG. 12B, the logical sum of the register value, 0010 and 0100. That is, each bit serves as a flag indicating whether or not significant data exists in the frequency band corresponding to the bit and thus the frequency band can be obtained for each of the horizontal and vertical directions. Therefore, separate distortion removal characteristics can be selected for each of the horizontal and vertical directions, thereby achieving optimum distortion removal. This is convenient for a case where a strong edge is present in the horizontal or vertical direction because desirable distortion removal characteristics for blocks can be selected for each of the directions though the processing becomes further complicated as compared with the methods described so far.

According to the modification, therefore, by adaptively performing convolution lowpass filtering which permits the preservation of the band of significant data of transform coefficients obtained by decoding compressed data on each of blocks, distortion can be removed without blurring of the structure of each block. Moreover, the processing time can be shortened because the processing requires only counting of the amount of coding and significant coefficients.

The kernel size of the filter may be arbitrary. Prior to filtering, data for determining filter characteristics and reproduced data of blocks may be stored in a memory for subsequent filtering.

FIG. 13 is a block diagram of an image signal decoding device according to a third embodiment of the present invention. Image data is divided into blocks and orthogonal transform is performed for each of blocks. The transformed output is variable-length coded for compression and then transmitted or recorded. The compressed image data is applied to a variable-length code decoding circuit 211 which decodes variable-length codes of the compressed image data and applies decoded outputs to an inverse quantization circuit 212. The results of the inverse quantization are transform coefficients of each block which is a compression unit and thus correspond to spatial frequency components in the block.

The output data of the inverse quantization circuit 212 is applied to an inverse orthogonal transform circuit 213 and a coefficient decision circuit 214. The transform circuit 213 obtains an image signal in real space. The coefficient decision circuit 214 makes a comparison between absolute values of spatial frequency components and a threshold value for each of the blocks and sends significant coefficients larger than the threshold value to a distortion removal characteristic determining circuit 217.

The image signal obtained by the inverse orthogonal transform circuit 213 is applied to a sub-blocking circuit 215, so that it is divided into sub-blocks. Then, the image signal is applied to a distortion removing circuit 216, so that it is subjected to the optimum distortion removal for each of the sub-blocks. The distortion removing process is performed by the distortion removal circuit 216 using lowpass filtering characteristics, determined by the the distortion removal characteristic determining circuit 217, which permit the band of significant coefficients of each block, obtained by the coefficient decision circuit 214 when the distortion removing process is performed for each of the sub-blocks, to be preserved. And the output of the distortion removal circuit 216 is delivered to an output device 218.

Figure 14A:
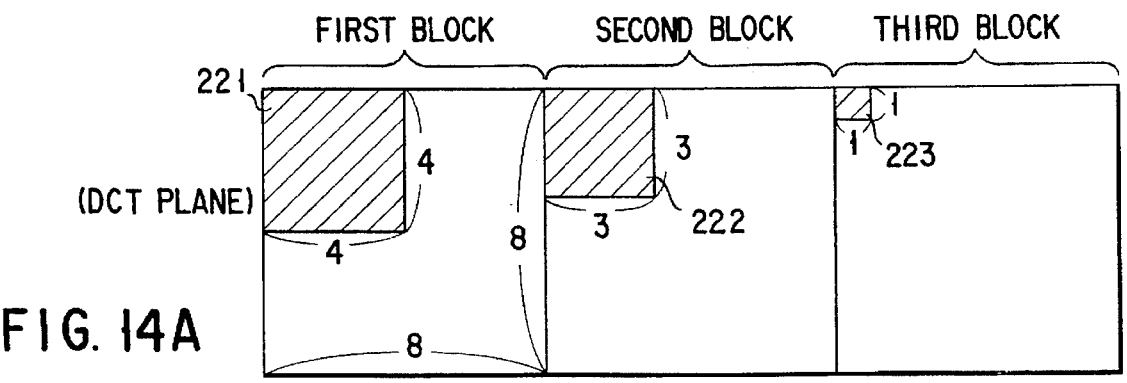
FIGS. 14A and 14B are diagrams illustrating the operations of the coefficient decision circuit and the distortion removal characteristic determining circuit of FIG. 13, respectively.

To be specific, suppose now that orthogonal transform coefficients of three blocks applied to the inverse orthogonal transform circuit 213 are DCT coefficients of 8 pixels×8 pixels as shown in FIG. 14A and the coefficients of a 4×4 portion 221, a 3×3 portion 222 and a 1×1 portion 223 each indicated by oblique hatching are not zeros. The coefficient decision circuit 214 decides that the portions 221, 222 and 223 indicated by oblique hatching are significant coefficients because they are not zeros. The way of deciding non-zeros as significant coefficients is effective because, in the coding to which the present invention is applied, the quantization width becomes large as the compression rate is increased, most of high-frequency components in particular, which are small in power, are quantized to zeros and few coefficients remain as significant coefficients.

Figure 14B:
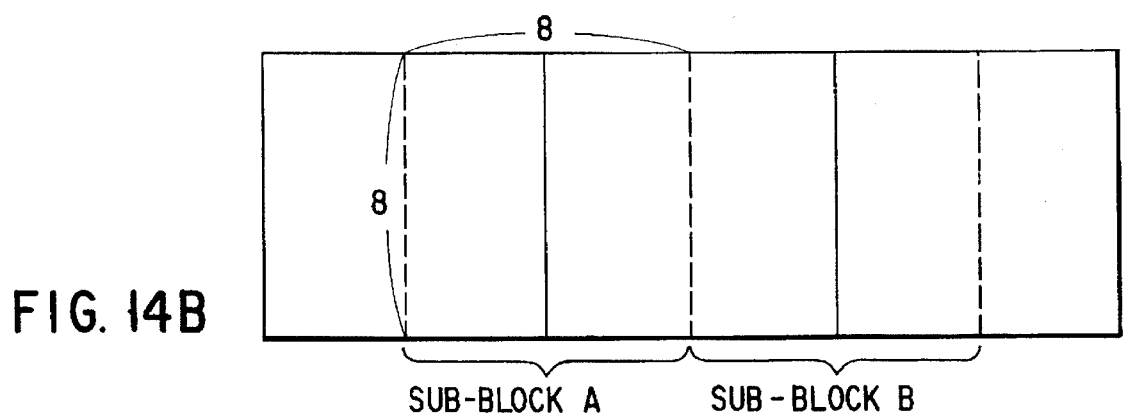

On the other hand, the distortion removing circuit 216 performs convolution filtering on image data divided into sub-blocks by the sub-blocking circuit 215. Here, consider only one-dimensional filtering in the horizontal direction as the distortion removing process for simplicity. The distortion removing circuit 216 performs a distortion removing process which preserves the band of significant coefficients of each of the blocks on an image signal which has been divided into sub-blocks as indicated by broken lines in FIG. 14B. That is, since the sub-block A extends over the first and second blocks and the sub-block B extends over the second and third blocks, the distortion removal characteristic determining circuit 217 selects a filter which permits the band of a block which is broader than that of the other block to be preserved. Thus, in the case of the sub-block A, the band of the first block is preserved, while, in the case of the sub-block B, the band of the second block is selected.

The reasons the block boundary at which block distortion exists and the sub-block boundary for distortion removal are made different from each other are as follows.

Figure 15A:
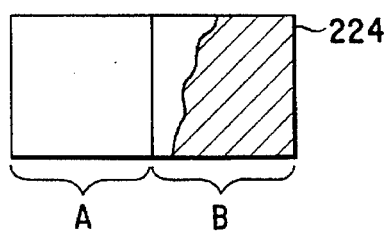
FIGS. 15A and 15B illustrate the states of blocks after and before filtering in the distortion removing circuit in a case where a block boundary and a sub-block boundary where block distortion is present are made coincident with each other.

FIG. 15A illustrates an example in which the block boundary at which block distortion exists and the sub-block boundary are made coincident with each other. The left block A contains only DC component in frequency. The left block B contains a shadow portion 224, indicated by oblique hatching, which presents a great contrast to other portions. That is, the block B has a strong edge and contains up to high-frequency components.

Figure 15B:

If filtering which preserves the frequency band of the block A is performed on all of pixels of the block A, a shadow portion will be produced in the block A when filter's taps are positioned in the hatching portion of the block B because of strong filtering on pixels near the block B. However, the edge will remain as it is because the pixels of the block B are scarcely subjected to lowpass filtering. Thus, after filtering such distortion as the edge is doubled may be produced as shown in FIG. 15B.

Such a distortion can be prevented by making the block boundary at which block distortion exists and the sub-block boundary for distortion removal different from each other as in the third embodiment.

Figure 16:
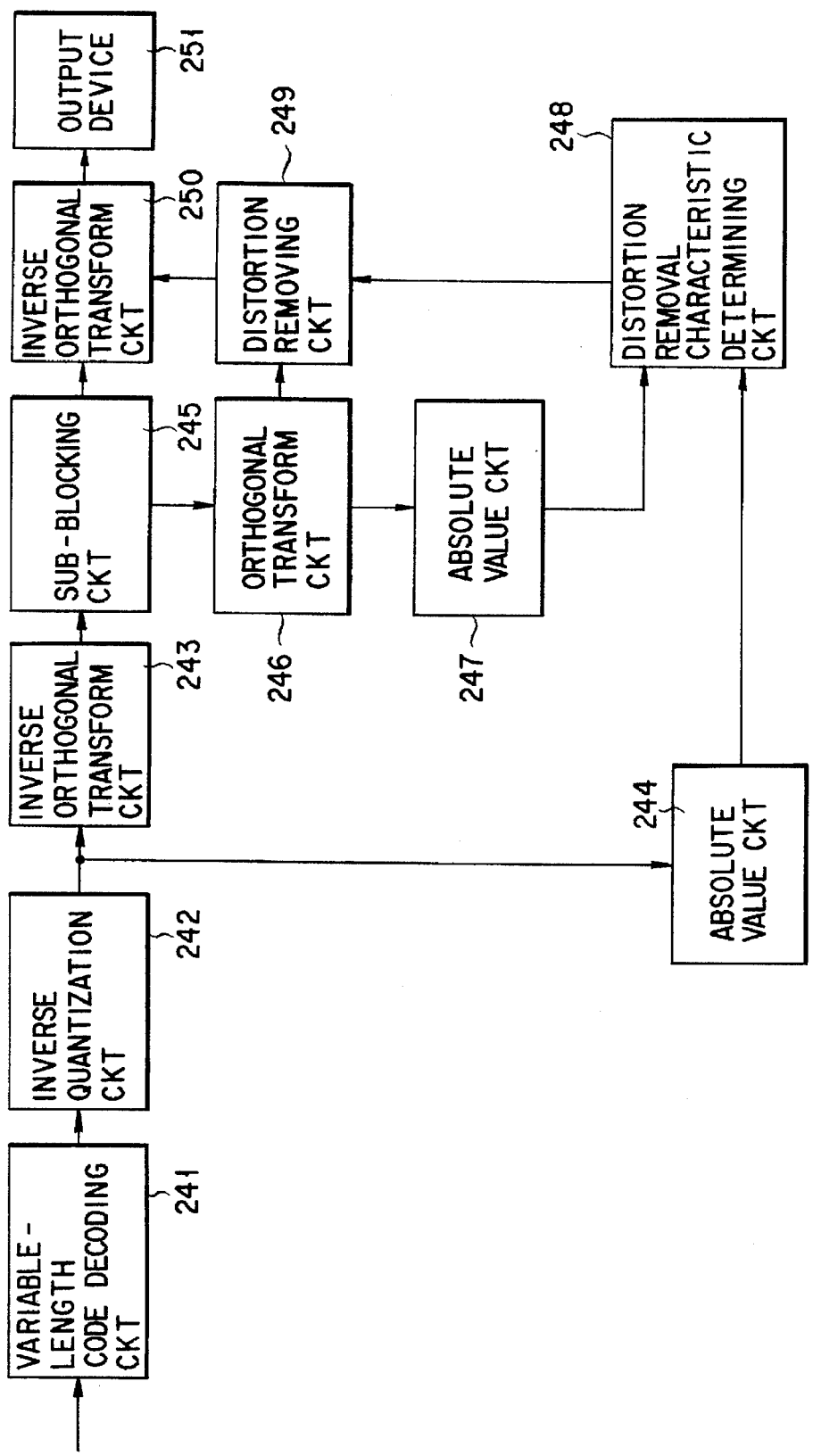
FIG. 16 is a block diagram of a modification of the third embodiment.

FIG. 16 is a block diagram of a modification of the third embodiment of the present invention. This modification permits filtering in a frequency region for transform coefficients.

In the modified image signal decoding device, a variable-length code decoding circuit 241 receives compressed image data and decodes variable-length codes of the compressed image data. The decoded output is applied to an inverse quantization circuit 242. The output of the inverse quantization circuit 242 is applied to an inverse orthogonal transform circuit 243 and an absolute value circuit 244. The inverse orthogonal transform circuit 243 inverse orthogonal transforms the inverse quantized output to obtain an image signal in real space. The image signal is applied to a sub-blocking circuit 245, so that it is divided into sub-blocks. In this case, the block boundary and the sub-block boundary for distortion removal are made different from each other.

The output of the sub-blocking circuit 245 is applied to an orthogonal transform circuit 246, so that it is transformed to orthogonal transform coefficients. The orthogonal transform coefficients are applied to a distortion removing circuit 249 and an absolute value circuit 247. The absolute value circuit converts the transform coefficients to absolute values, which are applied to a distortion removal characteristic determining circuit 248.

The distortion removal characteristic determining circuit 248 receives absolute values of the outputs of the inverse quantization circuit 242 from the absolute value circuit 244. Thus, the distortion removal characteristic determining circuit 248 makes a comparison between absolute values of both of the orthogonal transform coefficients to determine distortion removal characteristics and sends its information to the distortion removing circuit 249.

The distortion removing circuit 249 is responsive to the information to perform the optimum distortion removing process on each of the sub-blocks. The distortion removing process in this case is frequency filtering in an orthogonal transform coefficient plane. The way of determining the filter characteristics in the distortion removal characteristic determining circuit 248 is filtering which permits absolute values of the orthogonal transform coefficients of each of the sub-blocks to have substantially the same energy as those of blocks over which a sub-block extends.

This filter may be determined by only the output of the absolute circuit 244 or by the output of the coefficient decision circuit as in the third embodiment. In either case, the output of the orthogonal transform circuit 246 has only to be applied to the distortion removing circuit 249 and thus the necessity of the absolute value circuit 247 is obviated. After the filtering, the image signal is subjected to the inverse orthogonal transform again by the inverse orthogonal transform circuit 250 and then output from an output device 251.

Next, a description will be made of another modification of the third embodiment. In this modification, each of sub-blocks is made smaller in size than a block used at the time of compression and filter characteristics are changed according to their positions.

Figure 17:
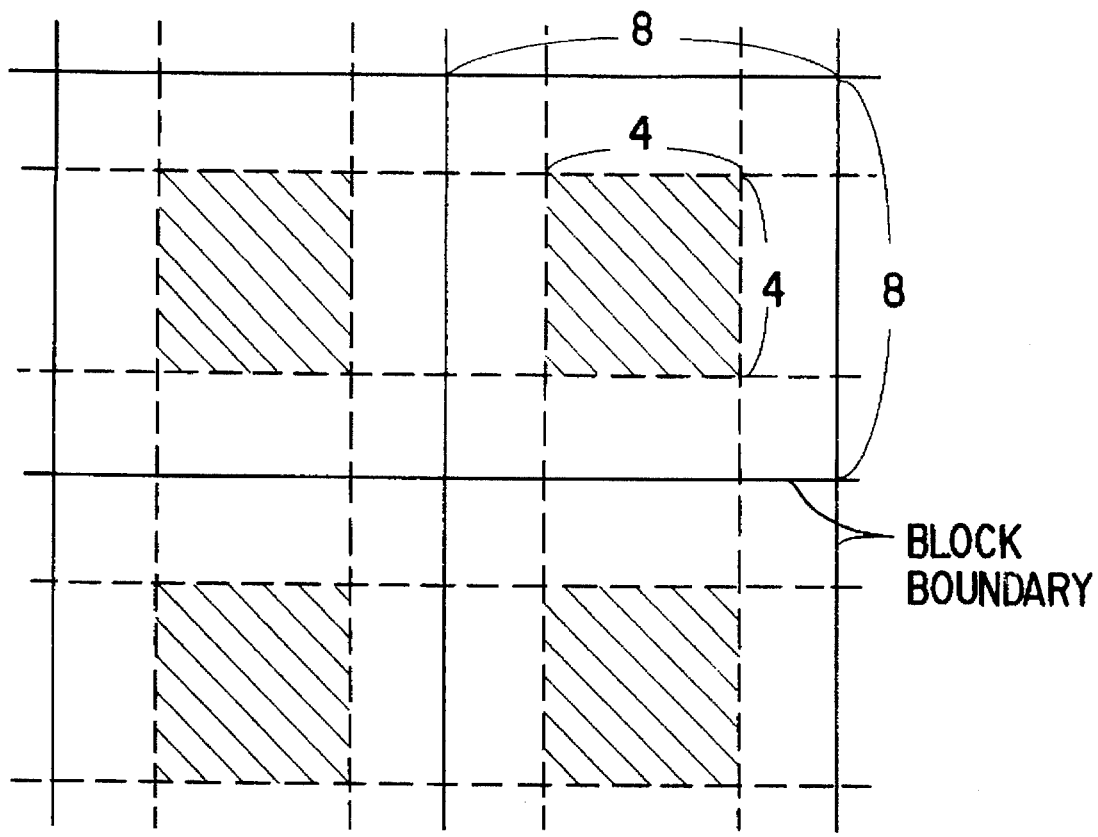
FIG. 17 illustrates a relationship between a block boundary at the time of compression and a sub-block for distortion removing process to explain the operation of an image signal decoding device according to another modification of the third embodiment.

In FIG. 17, solid lines indicate block boundaries set at the time of compression and broken lines indicate boundaries between 4×4 sub-blocks for distortion removal. The sub-blocks indicated by oblique hatching, which contain no block boundary, have little influence on the removal of block distortion due to high frequencies. Thus, it may be no use to make the distortion removal characteristics of such sub-blocks equal to those of sub-blocks each containing a block boundary.

In this modification, therefore, weak lowpass filtering is applied to sub-blocks which contain no block boundary except when very strong lowpass filtering is selected by the distortion removal characteristic determining circuit. Thus, a region, such as sky, which contains only low-frequency components is subjected to strong lowpass filtering as before and, in a region which contains high-frequency components, a portion near a block boundary and the other portion are subjected to different filtering.

To be specific, in the case of the third embodiment, it is only required that the sub-blocking circuit 215 send to the distortion removal characteristic determining circuit 217 information that to which block a sub-block belongs and information that whether or not a block boundary is contained.

According to the third embodiment and its modifications, by adaptively performing convolution lowpass filtering which permits the preservation of the band of significant data of transform coefficients obtained by decoding compressed data on each of sub-blocks, distortion can be removed without blurring of the structure of each block. Moreover, as an evaluation value for determining the degree of distortion removal, the amount of coding in each block, the number of significant coefficients of transform coefficients of each block or the sum of weights determined beforehand by the sequence of each of significant coefficients of transform coefficients of each block may be used.

The kernel size of the filter may be arbitrary. Prior to filtering, data for determining filter characteristics and reproduced data of blocks may be stored in a memory for subsequent filtering.

Hereinafter, the concept of a fourth embodiment of the present invention will be described.

Figure 18:
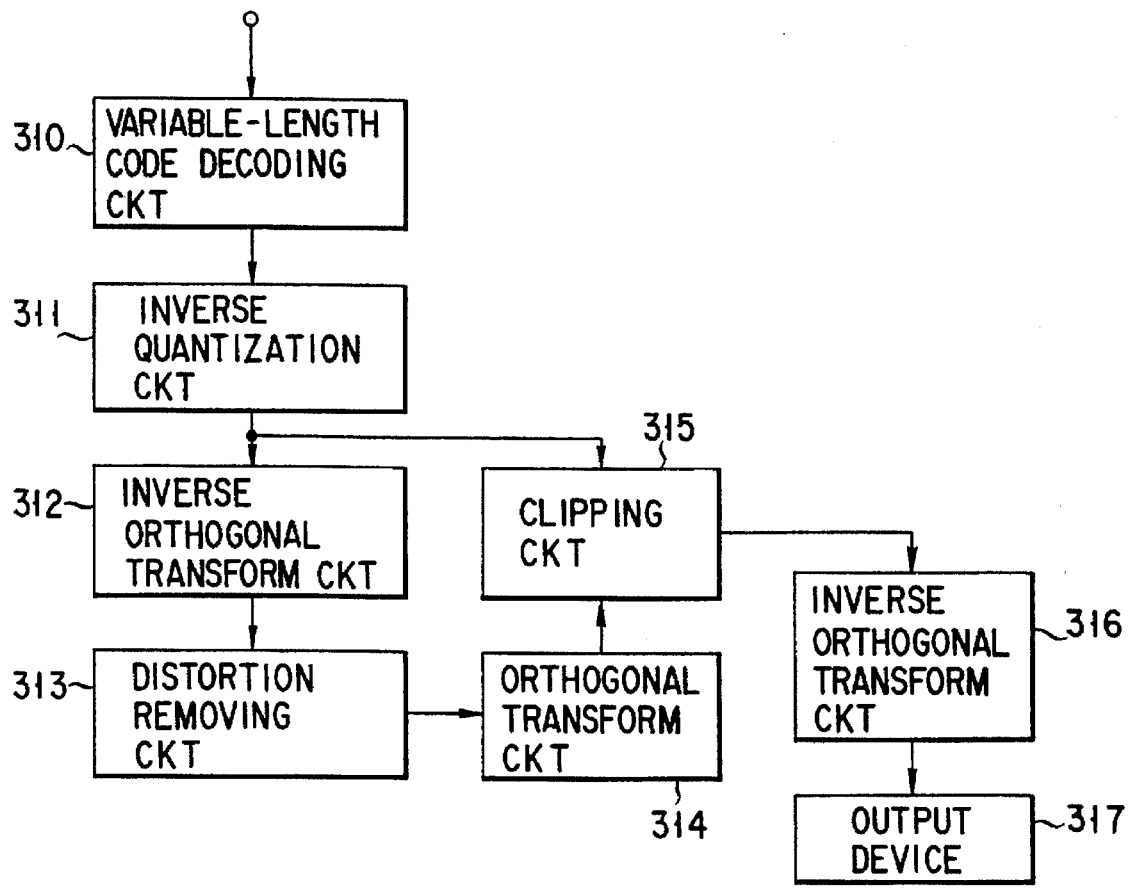
FIG. 18 is a block diagram for use in explanation of the concept of a fourth embodiment of the present invention.

In FIG. 18, compressed image data is read into a variable-length code decoding circuit 310. The output of the variable-length code decoding circuit is returned to orthogonal transform coefficients by an inverse quantization circuit 311. The orthogonal transform coefficients are transformed to real-space data by an inverse orthogonal transform circuit 312 and then subjected to a distortion removing process by a distortion removing circuit 313. The output of the distortion removing circuit 313 is transformed to orthogonal transform coefficients again by an orthogonal transform circuit 314. A clipping circuit 315 obtains the amount of change of each of orthogonal transform coefficients of the same block which are obtained by the orthogonal transform circuit 314 and the inverse quantization circuit 311. When the amount of change is greater than a possible maximum value of the quantization error of each coefficient, the transform coefficients after the distortion removing process are corrected such that the amount of change falls below the possible maximum value. The corrected coefficients are transformed to real-space data again by an inverse orthogonal transform circuit 316, the real-space data being displayed on an output device as a reproduced image.

In general, the noticeability of the block distortion varies with the spatial frequency of neighboring image portions. That is to say, when block distortion occurs in a portion of a fine structure which contains components up to a high frequency, the block distortion is not very noticeable. Conversely, where block distortion occurs in a portion which varies relatively slowly in gradations and thus contains only low frequency components, the block distortion is very noticeable.

On the other hand, the block distortion, which is due to discontinuity at a block boundary, has components up to a very high spatial frequency. Thus, by removing spatial frequency components higher than a spatial frequency of an image portion near the distortion, the block distortion can be made unnoticeable. In the case of an image containing high-frequency components, however, they will also be lost at the same time, thus blurring the image.

The quantization error of a transform coefficient, which is the cause of the block distortion, is produced by dividing the transform coefficient in a quantization width and replacing the divisions of the coefficient with their respective typical values. That is to say, since changes caused by a distortion removing process ought to change so that the quantization error of a transform coefficient decreases, a change cannot occur above a maximum quantization distortion amount supposed to be contained in the value of a transform coefficient before distortion removal.

Figure 19:
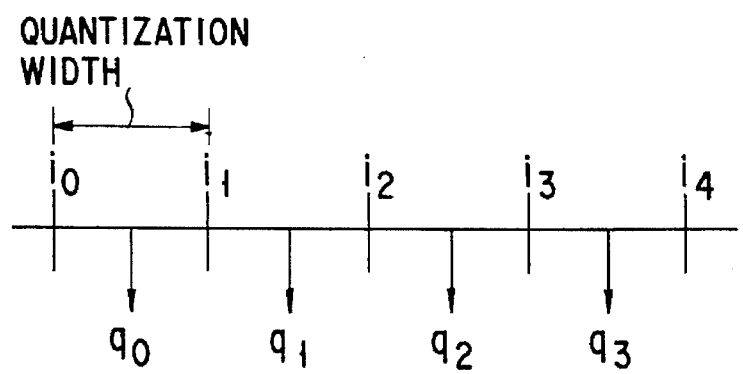
FIG. 19 is a diagram for use in explanation of the operation of a general quantizer.

This state will be explained with reference to FIG. 19. A general quantizer outputs, as a typical value, the average value of q0 for an input value ranging from i0 to i1, i1–i0 being the quantization width. Likewise, an input value from i1 to i2 is converted to q1 and an input value from i2 to i3 is converted to q2. Thus, once an input value is quantized, its true value cannot be obtained. For example, supposing that the quantized value q1 is given for an input value, it is found that its true value lies between i1 and i2. The maximum error between the quantized value and the true value is equal to half of the quantization width. Conversely, when a process of decreasing the quantization distortion is performed, the value of q1 changes between i1 and i2, and if q1 exceeds this, it is considered that deterioration of image information occurs.

The present embodiment performs orthogonal transform on an image subjected to a distortion removing process again and obtains the amount of change of a transform coefficient of each block produced by the distortion removing process. When the amount of change is greater than the maximum value of the quantization error, it is seen that even components present in an image signal were lost by the distortion removing process. In this case, clipping is performed so as to correct the amount of change of the coefficient so that it falls below the maximum value of the quantization error of each coefficient, thereby recovering the lost information.

Hereinafter, the fourth embodiment of the present invention will be described with reference to the drawings.

Here, suppose that recorded or transmitted image data has been subjected to compressed coding as follows. That is, in a coder, discrete cosine transform (DCT) is used for orthogonal transform and a quantizer performs the following transform.

When $D \geq 0$, $Q = \text{int}\{(D+Qw/2)/Qw\}$

When $D < 0$, $Q = \text{int}\{(D-Qw/2)/Qw\}$ (3)

where D is an input DCT coefficient, Q is the output, Qw is the quantization width and int represents omitting of decimals. As variable-length codes, huffman codes are used.

FIG. 20 is a block diagram of an image signal decoding device for decoding the results of coding according to the fourth embodiment of the present invention. A signal passing through a huffman decoding circuit 310A is represented by Q in equation (3). By passing through an inverse quantization circuit 311, the signal is represented by $Qi = Q \times Qw$ (4)

Qi contains the quantization error of the DCT coefficient.

The signal is temporarily stored in a memory 319, connected to a clipping circuit 315, on a block-by-block basis on one hand and applied to an IDCT (inverse discrete cosine transform) circuit 312A on the other hand.

The signal subjected to the IDCT by the IDCT circuit 312A on a block-by-block basis is written into a frame memory 318. A reproduced signal, containing data of all the blocks, from the frame memory is applied to a distortion removing circuit 313 and subjected to lowpass filtering therein. The result is divided into blocks which are exactly the same as before and then subjected to the DCT by a DCT circuit 314A. The output of the DCT circuit is applied to the clipping circuit 315. A comparison is made with the transform coefficients Qi which have been stored in the memory 319 prior to the distortion removing process.

This comparison permits how much each coefficient is changed by the distortion removing process to be obtained. When the coefficient Q' after the distortion removing process satisfies $Q' \geq (Qi+Qw/2)$ or $Q'<(Qi-Qw/2)$ when $Q' \geq 0$, and $Q'>(Qi+Qw/2)$ or $Q' \leq (Qi-Qw/2)$ when $Q'<0$, then, the clipping circuit 315 outputs the coefficients before the distortion removing process. Otherwise, the clipping circuit outputs coefficients after the distortion removing process. The output of the clipping circuit is subjected to the IDCT by an IDCT circuit 316A to obtain a reproduced signal which is, in turn, displayed on an output device 317.

The IDCT circuit 312A and the IDCT circuit 316A may be the same in configuration. The distortion removing process in the distortion removing circuit 313 may be performed by convolution filtering in real space or spatial frequency filtering in a Fourier transform plane. Any other process may be used if it can decrease distortion.

Next, a modification of the fourth embodiment will be described with reference to FIG. 21.

A signal passing through the Huffman decoding circuit 310A and the inverse quantization circuit 311 is applied to the IDCT circuit 312 on one hand and to the clipping circuit 315, on the other hand, where it is stored in a memory not shown. The signal subjected to the IDCT on a block-by-block basis by the IDCT circuit 312 is applied to the distortion removing circuit 313 where a reproduced signal composed of data of all the blocks is produced and subjected to lowpass filtering. The output of the distortion removing circuit 313 is selectively applied to the DCT circuit 314A or the output device 317 via a switching circuit 320. When applied to the DCT circuit 314A, the signal is converted to the DCT coefficients and then clipped by the clipping circuit 315.

The clipping circuit 315 outputs a signal which increments a repeat counter incorporated into a repetition decision circuit 321. The results of the clipping are applied to the IDCT circuit 312. The results of the clipping are subjected to the IDCT again by the IDCT circuit 312 and then sent to the distortion removing circuit 313.

The repetition decision circuit 321 uses the value of the repeat counter to decide whether or not the distortion removing process and clipping are to be performed on and after the second time. The distortion removing circuit 313 is instructed to perform filtering as in the last time when the distortion removing process is performed or to output an input signal as it is when the distortion removing process is not performed. At the same time, when it is decided that the clipping is not performed, the switching circuit 320 is switched for connection to the output device 317.

Figure 22:
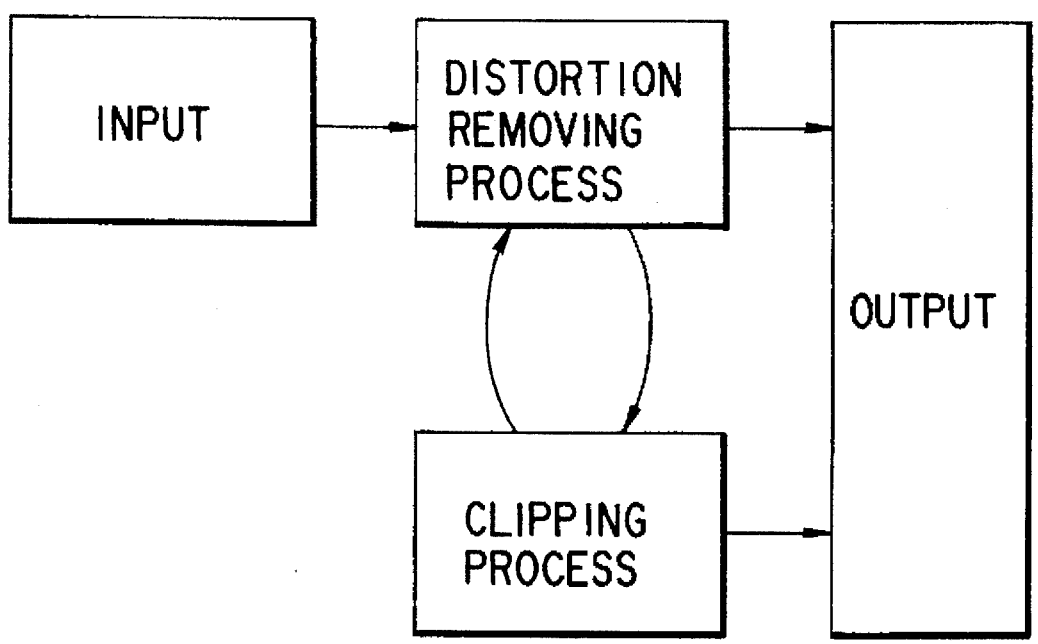
FIG. 22 is a diagram for use in explanation of a loop process in the modification of the fourth embodiment.

By doing so, the distortion removing process and the clipping can be carried out repeatedly until the switching circuit 320 is connected to the output device 317. As shown in FIG. 22 which is a conceptual representation, a loop process can be realized which permits an escape to be made from either of the distortion removing process and the clipping process.

This permits the use of a method which performs filtering in two or more installments in the distortion removing process. For example, use can be made of a method which obtains sharp cut-off frequency characteristics by the use of a multi-stage filter which applies a filter having slow cut-off frequency characteristics in two or more installments. In this case, when the number of stages of the filter is known and there is no need of performing the clipping every time within the loop, the clipping may be omitted.

It is desirable that the present embodiment have a function of changing the distortion removal characteristics according to the number of times of the distortion removal within the loop.

For example, when a convolution filter is used as a distortion removing filter, complex frequency cut-off characteristics can be obtained by making its kernel size large. However, the amount of calculation and the circuit scale required will increase. The present embodiment permits the use of a method of implementing a filter of desired characteristics by the use of a combination of small-size filters.

According to this system, it is possible to gradually reduce distortion which has been reduced by the filtering but is reproduced by the clipping. That is to say, when even only one of transform coefficients of a block is changed by clipping, the entire block is affected and thus block distortion may occur again. In general, however, since the distortion removing process has been performed once, the amount of distortion is small as compared with when data is input to the distortion removing circuit 313 first. Thus, the degree of lowpass filtering for the second-time distortion removing process may be lower than that for the first time. Likewise, the degree of lowpass filter for the third-time distortion removing process is made still lower. The filtering is repeated a suitable number of times until the distortion removing process becomes unnecessary.

Next, still another modification of the fourth embodiment which adaptively performs the distortion removing process on a block-by-block basis using the above method will be described.

To perform block distortion removal on the results obtained by decoding, this modification makes a comparison of transform coefficients of each block with a predetermined value and divides coefficients into significant coefficients and non-significant coefficients. The distortion removal characteristics are changed on a block-by-block basis on the basis of a frequency band corresponding to the significant coefficients.

Figure 23:
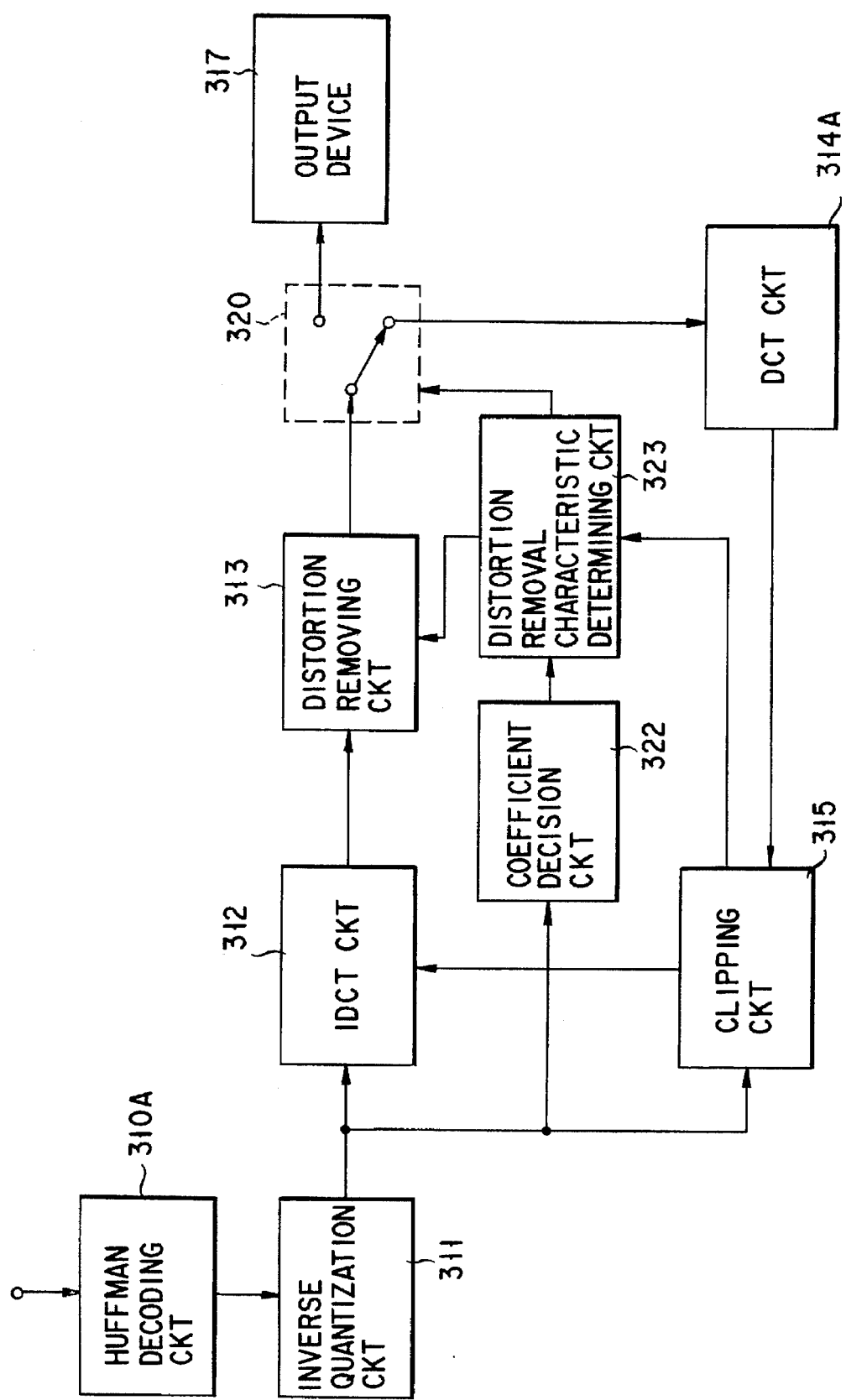
FIG. 23 is a block diagram of a modification of the fourth embodiment.
Figure 24:
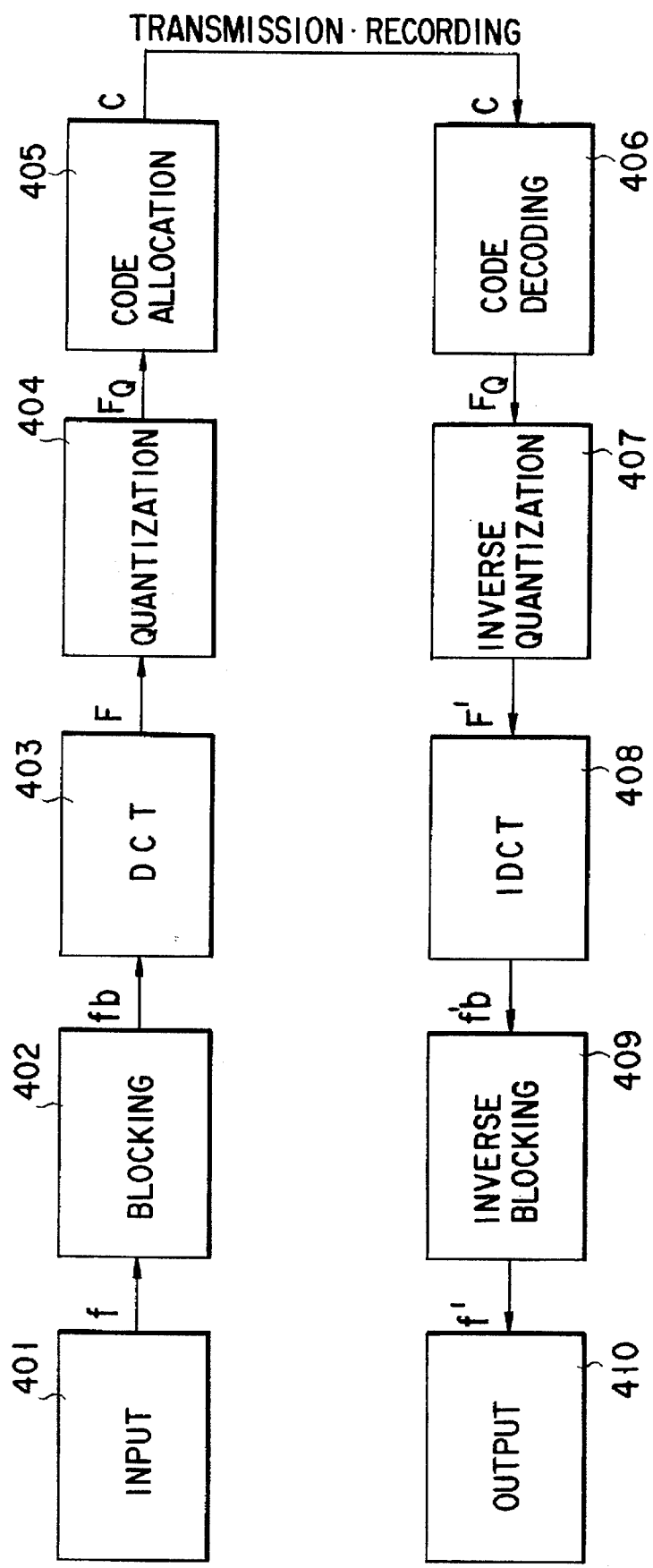
FIG. 24 is a flowchart illustrating the principle of a conventional image signal coding and decoding system.
Figures 25A, 25B:
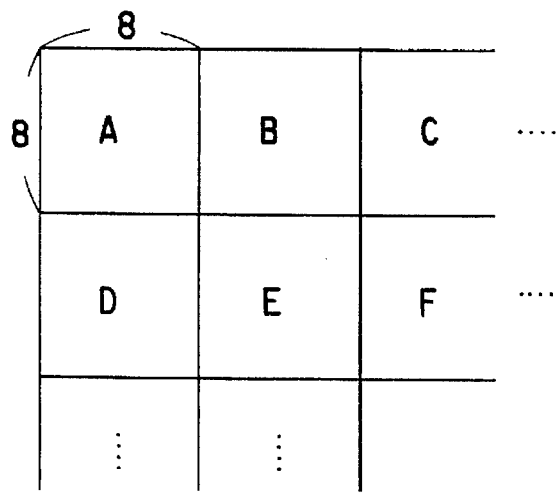
FIG. 25A is a diagram for use in explanation of blocking of image data.
FIG. 25B illustrates the results of discrete cosine transform.

FIG. 23 is a block diagram of the modification. The Huffman code decoding circuit 310A decodes variable-length codes of compressed image data. The results of inverse quantization by the inverse quantization circuit 311, which are transform coefficients of each block, correspond to spatial frequencies in the block. The data is applied to the IDCT circuit 312 to obtain an image signal in real space on one hand and used to determine distortion removal characteristics for the real-space image signal on the other hand.

The way of determining the characteristics involves making a comparison between absolute values of spatial frequency components and a threshold value for each of the blocks by the coefficient decision circuit 322, coefficients greater than the threshold value being handled as significant coefficients, and determining lowpass characteristics which permits the band of the significant coefficients to be preserved by the distortion removal characteristic determining circuit 323. In the distortion removing circuit 313, a distortion removing process with the determined characteristics is performed. The operations of the DCT circuit 314A and the clipping circuit 315 are the same as those in the previous modification.

By such a configuration, strong lowpass filtering which permits averaging over a wide range can be performed on blocks each of which contains only low spatial frequency components and, on the other hand, weak lowpass filtering which causes little blurring of images can be performed on blocks each containing components up to a relatively high frequency, thereby realizing lowpass filtering to an extent that the structures within blocks do not blur.

Having described in connection with the first embodiment, the description of the filtering is omitted here.

As described above, when the characteristics of the first-time filtering for distortion removal are determined by the distortion removal characteristic determining circuit 323, they are stored temporarily and then the filtering with the characteristics is performed on each block. Subsequently, the clipping is performed. With the second-time filtering, the lowpass characteristics for each block are made weaker than those of the first-time filtering. That is, the passband is made broader than that in FIG. 2C. Likewise, with the third-time filtering, the passband is made still broader. This process is repeated. When the filtering characteristics for all the blocks are made weak enough, an escape is made from the loop. At this time, with a block which does not need strong filtering characteristics from the beginning, the filtering will become unnecessary earlier than other blocks. In this case, subsequent filtering for the block is omitted.

To decide whether or not transform coefficients are significant coefficients, a decision of whether or not each coefficient is zero may be used instead of the decision based on comparison between the absolute value of each coefficient and a threshold value as in the present modification. Moreover, when there is a series of blocks each containing only significant coefficients of very low frequency components or no significant coefficients, they can be grouped together as a macro block which is subjected to strong lowpass filtering over a wide range.

The first through fourth embodiments need not be limited to the use of the block size, the type of orthogonal transform and the type of variable-length coding which are described above. The distortion removal filtering may be applied separately in the horizontal direction and the vertical direction. Alternatively, two-dimensional filtering may be applied at a time. The filtering may be applied only to the neighborhood of a block boundary, not to the entire block.

As described above, according to the first through fourth embodiments of the present invention, block distortion can be removed at high speed without blurring of an image by the use of only transmitted or recorded image information and moreover the circuitry used may be simple in construction. This permits the cost and size of the device to be decreased. The image signal decoding device can be applied not only to still images but also to moving images.

Moreover, since distortion removal characteristics are determined using only image data obtained prematurely during the decoding process, there is no need of adding information for distortion removal at the coder. Of course, there is no need of detecting the presence or absence of edges in an image and the block distortion. Thus, circuitry simple in configuration can be used. And when the modification is applied to a color image, luminance and color difference signals may be processed separately. Alternatively, the luminance signal may be processed first and the processing of the color difference signal may be determined using the distortion removal characteristics for the luminance signal. Moreover, desirable characteristics selected from the distortion removal characteristics determined on the basis of the luminance and color difference signals may be applied to both of the luminance and color difference signals.

Moreover, according to the first through fourth embodiments, the above advantages can be obtained without any modifications of a conventional image signal coding device. That is, for the standard compression system, it is required only that the decoding device alone be devised. Of course, the conventional reproduction can be performed. The degree of block distortion can be set freely.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. An image signal decoding device for decoding coded image data by dividing image data into blocks and performing an orthogonal transformation on the image data of each of the blocks, comprising:

inverse orthogonal transforming means for performing an inverse orthogonal transformation on the coded image data;

band detecting means for detecting a band of each of the coded image data, said band detecting means including coefficient decision means for dividing transform coefficients of each of the blocks, obtained via a decoding operation and an inverse orthogonal transformation operation for the coded image data, into significant coefficients and non-significant coefficients, said coefficient decision means including absolute value means for obtaining absolute values of the transform coefficients of each block and comparison means for comparing the absolute values of the transform coefficients with a threshold value, with transform coefficients larger than the threshold value being the significant coefficients; and distortion removing means for removing distortion of the coded image data subjected to the inverse orthogonal transformation operation via said inverse orthogonal transforming means while varying distortion removal characteristics according to the band detected by said band detecting means.

2. The image signal decoding device according to claim 1, further comprising:

a sub-blocking means for dividing a real image field represented by the data which have been subjected to said inverse orthogonal transformation operation via said inverse orthogonal transforming means into a plurality of sub-blocks; and a distortion removal characteristic determining means for obtaining an evaluation value of the sub-blocks and for varying distortion removal characteristics on the basis of said evaluation value.

3. The image signal decoding device according to claim 2, further comprising orthogonal transform means for transforming an output of said sub-blocking means to orthogonal transform coefficients, first absolute value means for converting the orthogonal transform coefficients from said orthogonal transform means to first absolute values and second absolute value means for obtaining second absolute values of inverse-quantized transform coefficients, and in which said distortion removal characteristic determining means determines distortion removal characteristics on the basis of the first and second absolute values.

4. An image signal decoding device for decoding supplied coded image data previously compressed by dividing into blocks and performing orthogonal transformation on the image data of each of the blocks and further quantizing frequency components obtained via said orthogonal transformation, said supplied image data in compressed form being decompressed through said decoding, comprising:

inverse quantization means for performing an inverse quantization on the compressed data supplied thereto and for reproducing coefficients for said orthogonal transformation;

inverse orthogonal transforming means for performing inverse orthogonal transformation on the inverse-quantized data obtained via said inverse quantization means so as to obtain decompressed image data of decoded form and for producing decoded image data;

recognizing means for providing recognition of a state of distribution concerning said coefficients for said orthogonal transformation on the basis of only coefficients reproduced via said inverse quantization means; and distortion removing means for removing distortion included in said decompressed image data produced by said inverse orthogonal transforming means, thereby varying distortion removal characteristics on the basis of the recognition for said state of distribution concerning said coefficients as made via said recognizing means.

5. The image signal decoding device according to claim 4, wherein said distortion removing means includes a spatial frequency filtering means for carrying out a distortion removing process through which the filtering characteristics thereof as a lowpass filter are modified depending on a discrimination based on said recognition for said state of distribution concerning said coefficients, said discrimination for discriminating significant coefficients among said transform coefficients for said orthogonal transformation from non-significant coefficients, thereby removing a distortion revealed in the decoded image data.

6. The image signal decoding device according to claim 4, wherein said band recognizing means includes discriminating means for discriminating whether transform coefficients of each of the blocks are significant coefficients or non-significant coefficients, according to predetermined criteria.

7. The image signal decoding device according to claim 6, wherein said discriminating means include comparison means for comparing values of the transform coefficients with a predetermined threshold value, and for identifying significant coefficients exceeding the predetermined threshold value.

8. The image signal decoding device according to claim 6, wherein said discriminating means includes identifying means for identifying non-zero transform coefficients of each block as the significant coefficient.

9. The image signal decoding device according to claim 5, further comprising:
a first determining means for determining a kernel size and coefficients of said spatial frequency filtering means along a horizontal direction on the basis of a transform coefficient corresponding to the highest frequency along the horizontal direction; and
a second determining means for determining a kernel size and coefficients of said spatial frequency filtering means along a vertical direction on the basis of a transform coefficient corresponding to the highest frequency along the vertical direction.

10. An image signal decoding device for decoding supplied coded image data previously compressed by dividing into blocks and performing orthogonal transformation on the image data of each of the blocks and further quantizing frequency components obtained via said orthogonal transformation, said supplied image data in compressed form being decompressed through said decoding, comprising:
inverse quantization means for performing an inverse quantization on the compressed data supplied thereto and for reproducing coefficients for said orthogonal transformation;

inverse orthogonal transforming means for performing inverse orthogonal transformation on the inverse-quantized data obtained via said inverse quantization means so as to obtain decoded image data of decompressed form of a real image data representing a real image field;

field dividing means for dividing said real image field into a plurality of sub-blocks in such a manner that a block boundary of each of said sub-blocks is not overlapped with a block boundary of each of said blocks, each of said sub-blocks being subjected to a lowpass filtering process through which the real image data of said real image field are processed depending upon defined operations;

an operation mode defining means for defining an operation mode of said defined operations performed through said lowpass filtering process, on a basis of a state of each of said sub-blocks.

11. The image signal decoding device according to claim 10, wherein said operation mode defining means adaptively modifies the operation of said operation mode in response to a set position of each of said sub-blocks.

12. The image signal decoding device according to claim 10, wherein said field dividing means divides said image field into a plurality of sub-blocks some of which are positioned inside of the blocks for the orthogonal transform, and said operation mode defining means defining said operation mode for said lowpass filtering process as a spatial frequency filtering operation.

13. The image signal decoding device according to claim 12, wherein said operation mode defining means defining said operation mode so functioning as a spatial frequency filter which effects some of said sub-blocks being inside of said blocks for the orthogonal transformation, as a weak lowpass filter.

14. The image signal decoding device according to claim 12, further comprising one-dimensional filter means respectively functioning as the spatial frequency filtering means for a horizontal direction and a vertical direction.

15. An image signal decoding device for decoding supplied coded image data previously compressed by dividing into blocks and performing orthogonal transformation on the image data of each of the blocks and further quantizing frequency components obtained via said orthogonal transformation, said supplied image data in compressed form being decompressed through said decoding, comprising:
inverse quantization means for performing an inverse quantization on the compressed data supplied thereto and for reproducing coefficients for said orthogonal transformation;

inverse orthogonal transforming means for performing inverse orthogonal transformation on the inverse-quantized data obtained via said inverse quantization means so as to obtain decoded image data in decompressed form of a real image data representing a real image field;

recognizing means for providing recognition of a state of distribution concerning said coefficients for said orthogonal transformation on the basis of only coefficients reproduced via said inverse quantization means;

field dividing means for dividing said real image field into a plurality of sub-blocks in such a manner that a block boundary of each of said sub-blocks is not overlapped with a block boundary of each of said blocks, each of said sub-blocks being subjected to a lowpass filtering process through which the real image data of said real image field are processed depending upon defined operations; and an operation mode defining means for defining an operation mode of said defined operations performed through said lowpass filtering process, on a basis of a range of said coefficients for orthogonal transformation, recognized via said recognizing means, corresponding to each of said sub-blocks.

16. The image signal decoding device according to claim 15, wherein said operation mode defining means adaptively modifies the operation of said operation mode in response to a set position of the corresponding sub-block.

17. The image signal decoding device according to claim 15, wherein said field dividing means divides said image field into a plurality of sub-blocks some of which are positioned inside of the blocks for the orthogonal transform, and said operation mode defining means defines said operation mode for said lowpass filtering process as a spatial frequency filtering operation.

18. The image signal decoding device according to claim 17, wherein said operation mode defining means defines said operation mode so functioning as a spatial frequency filter operation which affects some of said sub-blocks being inside of said blocks for the orthogonal transform, as a weak lowpass filter.

19. The image signal decoding device according to claim 17, further comprising one-dimensional filter means respectively functioning as the spatial frequency filtering means for a horizontal direction and a vertical direction.

20. The image signal decoding device according to claim 15, wherein said operation mode defining means adaptively modifies the operation of said operation mode according to a relative position of the corresponding sub-block to a block boundary for the orthogonal transform.

21. The image signal decoding device according to claim 15, wherein said operation mode defining means defines said operation mode according to a position of the corresponding sub-block whether the sub-block is positioned or not positioned on the block boundary for the orthogonal transform.

22. The image signal decoding device according to claim 15, wherein said field dividing means divides said real image field into a plurality of sub-blocks each of which is smaller than the block for the orthogonal transform.

23. An image signal decoding device for decoding coded image data by dividing image data into blocks and performing an orthogonal transformation on the image data of each of the blocks, comprising:

inverse orthogonal transforming means for performing an inverse orthogonal transformation on the coded image data;

band detecting means for detecting a band of each of the coded image data, said band detecting means including coefficient decision means for deciding whether or not transform coefficients of each of the blocks obtained by decoding and inverse orthogonal transforming the coded data are significant coefficients;

distortion removing means for removing distortion of the coded image data subjected to the inverse orthogonal transforming operation via said inverse orthogonal transforming means while varying distortion removal characteristics according to the band detected by said band detecting means; and weight adder means for adding weights depending on frequencies of non-zero coefficients, the sum of the weights being used to determine said distortion removal characteristics.

24. An image signal decoding device for decoding coded image data by dividing image data into blocks and performing an orthogonal transformation on the image data of each of the blocks, comprising:

a first inverse orthogonal transforming means for performing an inverse orthogonal transformation on the coded image data;

band detecting means for detecting a band of each of the blocks of the coded image data;

distortion removing means for removing distortion of the coded image data subjected to the inverse orthogonal transformation by said inverse orthogonal transforming means while varying distortion removal characteristics according to the band detected by said detecting means;

orthogonal transforming means for transforming an output of said distortion removing means to orthogonal transform coefficients;

clipping means for calculating the amount of change of each coefficient on the basis of inverse-quantized transform coefficients, comparing the calculated amount of change with a maximum value of quantization error and correcting orthogonal transform coefficients from said orthogonal transforming means on the basis of the result of the comparison; and a second inverse orthogonal transforming means for inverse-orthogonal transforming corrected values from said clipping means.

25. The image signal decoding device according to claim 24, further comprising a repetition decision means for counting the number of times of the distortion removing and clipping operation and stopping the clipping operation when a predetermined number of times is reached to thereby vary the distortion removal characteristics.

26. An image signal decoding device for decoding supplied coded image data previously compressed by dividing into blocks and performing orthogonal transformation on the image data of each of the blocks, quantizing frequency components obtained via said orthogonal transformation and further coding the quantized data so as to produce coded image data of specifically coded form, said supplied image data of compressed form being decompressed through said decoding, comprising:

specific decoding means for decoding said coded image data of specifically coded form supplied thereto so as to reproduce said quantized data;

inverse quantization means for performing an inverse quantization on the reproduced quantized data so as to reproduce coefficients for said orthogonal transformation;

inverse orthogonal transforming means for performing inverse orthogonal transformation on the inverse-quantized data obtained via said inverse quantization means so as to obtain decompressed image data of decoded form;

recognizing means for providing recognition of a state of distribution concerning said coefficients for said orthogonal transformation on the basis of only said quantized data reproduced via said specific decoding means; and distortion removing means for removing distortion included in said decompressed image data issued from said inverse orthogonal transforming means thereby varying distortion removal characteristics on the basis of the recognition for said state of distribution concerning said quantized data reproduced via said specific decoding means, said state being seized via said recognizing means.

27. An image signal decoding device for decoding supplied coded image data previously compressed by dividing into blocks and performing orthogonal transformation on the image data of each of the blocks, quantizing frequency components obtained via said orthogonal transformation and further coding the quantized data so as to produce coded image data of specifically coded form, said supplied image data of compressed form being decompressed through said decoding, comprising:

specific decoding means for decoding said coded image data of specifically coded form supplied thereto so as to reproduce said quantized data;

inverse quantization means for performing an inverse quantization on the reproduced quantized data so as to reproduce coefficients for said orthogonal transformation;

inverse orthogonal transforming means for performing inverse orthogonal transformation on the inverse-quantized data obtained via said inverse quantization means so as to obtain decoded image data of decompressed form of a real image data representing a real image field;

recognizing means for providing recognition of a state of distribution concerning said coefficients for said orthogonal transformation on the basis of only said quantized data reproduced via said specific decoding means;

field dividing means for dividing said real image field into a plurality of sub-blocks in such a manner that a block boundary of each of said sub-blocks is not overlapped with a block boundary of each of said blocks, each of said sub-blocks being subjected to a lowpass filtering process through which the real image data of said real image field are processed depending upon a defined operation;

an operation mode defining means for defining an operation mode of said defined operation performed through said lowpass filtering process, on the ground of a range of said quantized data reproduced via said specific decoding means, said range being seized via said recognizing means, corresponding to each of said sub-blocks.

28. An image signal decoding device for decoding supplied coded image data previously compressed by dividing into blocks and performing orthogonal transformation on the image data of each of the blocks and further quantizing frequency components obtained via said orthogonal transformation, said supplied image data in compressed form being decompressed through said decoding, comprising:

inverse quantization means for performing an inverse quantization on the compressed data supplied thereto and for reproducing coefficients for said orthogonal transformation;

inverse orthogonal transforming means for performing inverse orthogonal transformation on the inverse-quantized data obtained via said inverse quantization means so as to obtain decoded image data in decompressed form of a real image data representing a real image field;

recognizing means for providing recognition of a state of distribution concerning said coefficients for said orthogonal transformation on the basis of only coefficients reproduced via said inverse quantization means;

field dividing means for dividing said real image field into a plurality of sub-blocks in such a manner that a block boundary of each of said sub-blocks is not overlapped with a block boundary of each of said blocks, each of said sub-blocks being subjected to a lowpass filtering process through which the real image data of said real image field are processed depending upon defined operations;

an operation mode defining means for defining an operation mode of said defined operations performed through said lowpass filtering process, on a basis of a range of said coefficients for orthogonal transformation, recognized via said recognizing means, corresponding to each of said sub-blocks; and wherein said recognizing means includes discriminating means for discriminating whether said coefficients of each of the blocks are significant coefficients or non-significant coefficients, according to predetermined criteria.

29. An image signal decoding device for decoding supplied coded image data previously compressed by dividing into blocks and performing orthogonal transformation on the image data of each of the blocks and further quantizing frequency components obtained via said orthogonal transformation, said supplied image data in compressed form being decompressed through said decoding, comprising:

inverse quantization means for performing an inverse quantization on the compressed data supplied thereto and for reproducing coefficients for said orthogonal transformation;

inverse orthogonal transforming means for performing inverse orthogonal transformation on the inverse-quantized data obtained via said inverse quantization means so as to obtain decoded image data in decompressed form of a real image data representing a real image field;

recognizing means for providing recognition of a state of distribution concerning said coefficients for said orthogonal transformation on the basis of only coefficients reproduced via said inverse quantization means;

field dividing means for dividing said real image field into a plurality of sub-blocks in such a manner that a block boundary of each of said sub-blocks is not overlapped with a block boundary of each of said blocks, each of said sub-blocks being subjected to a lowpass filtering process through which the real image data of said real image field are processed depending upon defined operations;

an operation mode defining means for defining an operation mode of said defined operations performed through said lowpass filtering process, on a basis of a range of said coefficients for orthogonal transformation, recognized via said recognizing means, corresponding to each of said sub-blocks;

wherein said recognizing means includes discriminating means for discriminating whether said coefficients of each of the blocks are significant coefficients or non-significant coefficients, according to predetermined criteria; and wherein said discriminating means includes identifying means for identifying non-zero coefficients of each block as the significant coefficients.

30. The image signal decoding device according to claim 29, wherein said operation mode defining means adaptively modifies the operation of said operation mode in response to a set position of the corresponding sub-block.

31. The image signal decoding device according to claim 29, wherein said field dividing means divides said image field into a plurality of sub-blocks some of which are positioned inside of the blocks for the orthogonal transform, and said operation mode defining means defines said operation mode for said lowpass filtering process as a spatial frequency filtering operation.

32. The image signal decoding device according to claim 31, wherein said operation mode defining means defines said operation mode functioning as a spatial frequency filter which affects some of said sub-blocks being inside of said blocks for the orthogonal transform, as a weak lowpass filter.

33. The image signal decoding device according to claim 31, further comprising one-dimensional filter means respectively functioning as the spatial frequency filtering means for a horizontal direction and a vertical direction.

34. The image signal decoding device according to claim 29, wherein said operation mode defining means adaptively modifies the operation of said operation mode according to a relative position of the corresponding sub-block to a block boundary for the orthogonal transform.

35. The image signal decoding device according to claim 29, wherein said operation mode defining means defines said operation mode according to a position of the corresponding sub-block whether the sub-block is positioned or not positioned on the block boundary for the orthogonal transform.

36. The image signal decoding device according to claim 29, wherein said field dividing means divides said real image field into a plurality of sub-blocks each of which is smaller than the block for the orthogonal transform.

* * * * *